United States Patent
Gross et al.

(10) Patent No.: US 12,002,305 B1
(45) Date of Patent: Jun. 4, 2024

(54) SYSTEMS AND METHODS FOR GENERATING IMPROVED VEHICLE USAGE ANALYTICS BASED UPON VEHICLE SENSOR AND TELEMATICS DATA

(71) Applicant: State Farm Mutual Automobile Insurance Company, Bloomington, IL (US)

(72) Inventors: Ryan Michael Gross, Normal, IL (US); Joseph Robert Brannan, Bloomington, IL (US); Brian N. Harvey, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 199 days.

(21) Appl. No.: 16/780,512

(22) Filed: Feb. 3, 2020

Related U.S. Application Data

(60) Provisional application No. 62/934,932, filed on Nov. 13, 2019, provisional application No. 62/934,948, (Continued)

(51) Int. Cl.
*G06Q 40/08* (2012.01)
*G06Q 40/02* (2023.01)
(Continued)

(52) U.S. Cl.
CPC ........... *G07C 5/0808* (2013.01); *G06Q 40/02* (2013.01); *G06Q 40/08* (2013.01); *G07C 5/008* (2013.01); *G07C 5/085* (2013.01)

(58) Field of Classification Search
CPC ...... G07C 5/0808; G07C 5/085; G07C 5/008; G06Q 40/02; G06Q 40/08
See application file for complete search history.

(56) References Cited

U.S. PATENT DOCUMENTS 6,980,670 B1   12/2005   Hoffman et al.
8,036,824 B2   10/2011   Huang
(Continued)

OTHER PUBLICATIONS

He et al., "Profiling Driver Behavior for Personalized Insurance Pricing and Maximal Profit", 2018 IEEE International Conference on Big Data (Big Data), 2018, pp. 1387-1396 (Year: 2018).
(Continued)

*Primary Examiner* — Scott S Trotter
*Assistant Examiner* — William D Newlon
(74) *Attorney, Agent, or Firm* — Armstrong Teasdale LLP

(57) ABSTRACT

A vehicle analytics (VA) computing device may be configured to: (i) receive, from the connected vehicle, telematics data corresponding to the connected vehicle; (ii) identify a plurality of trips of the vehicle based upon the telematics data; (iii) store the telematics data corresponding to each trip of the plurality of trips in a database in association with a trip identifier corresponding to the trip; (iv) determine, for each of the plurality of trips, a number of passengers present in the vehicle; (v) store the determined number of passengers in the database in association with the trip identifier corresponding to the trip; and (vi) calculate an insurance premium associated with an insurance policy based upon the determined number of passengers in the vehicle.

21 Claims, 11 Drawing Sheets

Related U.S. Application Data filed on Nov. 13, 2019, provisional application No. 62/892,916, filed on Aug. 28, 2019, provisional application No. 62/892,853, filed on Aug. 28, 2019.

(51) Int. Cl.
  *G07C 5/00* (2006.01)
  *G07C 5/08* (2006.01)

(56) References Cited

U.S. PATENT DOCUMENTS

| | | | |
|---|---|---|---|
| 8,688,532 | B2 | 4/2014 | Khunger et al. |
| 9,311,271 | B2 | 4/2016 | Wright |
| 9,633,487 | B2 | 4/2017 | Wright |
| 9,688,286 | B2 | 6/2017 | Wilkes, III |
| 9,754,425 | B1 | 9/2017 | Iqbal |
| 9,764,742 | B1 | 9/2017 | Goldfarb |
| 9,786,009 | B2 | 10/2017 | Schumann, Jr. |
| 9,916,625 | B2 | 3/2018 | Lehman et al. |
| 9,996,884 | B2 | 6/2018 | Collopy et al. |
| 10,049,408 | B2 | 8/2018 | Carver et al. |
| 10,089,694 | B1 | 10/2018 | Biemer |
| 10,133,942 | B2 | 11/2018 | Gleeson-May et al. |
| 10,192,369 | B2 | 1/2019 | Wright |
| 10,198,879 | B2 | 2/2019 | Wright |
| 10,373,257 | B1 | 8/2019 | Iqbal et al. |
| 10,373,259 | B1 | 8/2019 | Konrardy et al. |
| 10,449,967 | B1 | 10/2019 | Ferguson |
| 10,475,127 | B1 | 11/2019 | Potter et al. |
| 10,540,723 | B1 | 1/2020 | Potter et al. |
| 10,552,912 | B1 | 2/2020 | Roll et al. |
| 10,565,593 | B1 * | 2/2020 | Aabram ............ G07F 17/0057 |
| 10,566,593 | B2 | 2/2020 | Hying et al. |
| 10,664,917 | B1 * | 5/2020 | Wasserman ............ G08G 1/143 |
| 10,692,149 | B1 * | 6/2020 | Loo ............ G06Q 40/08 |
| 10,783,587 | B1 | 9/2020 | Augustine et al. |
| 10,803,525 | B1 | 10/2020 | Augustine et al. |
| 10,830,605 | B1 * | 11/2020 | Chintakindi ............ G06Q 40/08 |
| 10,832,342 | B1 | 11/2020 | Gregorio et al. |
| 10,878,328 | B2 * | 12/2020 | Mathur ............ G06N 20/20 |
| 10,885,539 | B1 | 1/2021 | Purgatorio |
| 10,895,463 | B1 | 1/2021 | Cope |
| 10,915,964 | B1 | 2/2021 | Purgatorio |
| 11,023,898 | B1 | 6/2021 | Aabram |
| 11,030,696 | B1 | 6/2021 | Potter et al. |
| 11,312,385 | B1 | 4/2022 | Russo |
| 11,544,791 | B1 | 1/2023 | Gross |
| 11,578,990 | B1 | 2/2023 | Chintakindi |
| 11,599,947 | B1 | 3/2023 | Gross |
| 2009/0210302 | A1 | 8/2009 | Tashev et al. |
| 2010/0131304 | A1 | 5/2010 | Collopy et al. |
| 2011/0040579 | A1 | 2/2011 | Havens |
| 2012/0010906 | A1 | 1/2012 | Foladare |
| 2012/0066007 | A1 | 3/2012 | Ferrick et al. |
| 2012/0209718 | A1 | 8/2012 | Plut |
| 2013/0006675 | A1 | 1/2013 | Bowne |
| 2013/0282467 | A1 | 10/2013 | Postrel |
| 2013/0317736 | A1 | 11/2013 | Fernandes |
| 2014/0095214 | A1 | 4/2014 | Mathe et al. |
| 2014/0095305 | A1 | 4/2014 | Armitage et al. |
| 2014/0108058 | A1 * | 4/2014 | Bourne ............ G06Q 40/08 705/4 |
| 2014/0310169 | A1 | 10/2014 | Kacena |
| 2015/0019265 | A1 | 1/2015 | Roll et al. |
| 2015/0039362 | A1 | 2/2015 | Haque |
| 2015/0081404 | A1 | 3/2015 | Basir |
| 2015/0106132 | A1 * | 4/2015 | Johnson ............ G06Q 40/08 705/4 |
| 2015/0294422 | A1 | 10/2015 | Carver et al. |
| 2016/0086397 | A1 * | 3/2016 | Phillips ............ B60R 25/252 701/1 |
| 2016/0109251 | A1 | 4/2016 | Thakur |
| 2016/0364679 | A1 | 12/2016 | Cao |
| 2017/0140293 | A1 * | 5/2017 | Vij ............ G06F 16/29 |
| 2017/0220966 | A1 | 8/2017 | Wang |
| 2017/0255966 | A1 | 9/2017 | Khoury |
| 2017/0262770 | A1 | 9/2017 | Purdy et al. |
| 2017/0282930 | A1 * | 10/2017 | Kochhar ............ B60W 50/0097 |
| 2017/0308819 | A1 | 10/2017 | Liu |
| 2017/0344932 | A1 | 11/2017 | Ahmadi |
| 2017/0349089 | A1 * | 12/2017 | Fournier ............ B60Q 1/26 |
| 2017/0365007 | A1 * | 12/2017 | Huls ............ H04W 8/18 |
| 2017/0372431 | A1 | 12/2017 | Perl |
| 2018/0047107 | A1 | 2/2018 | Perl et al. |
| 2018/0075380 | A1 | 3/2018 | Perl et al. |
| 2018/0089605 | A1 | 3/2018 | Poornachandran et al. |
| 2018/0237026 | A1 * | 8/2018 | Chowdhury ............ G07C 5/008 |
| 2018/0342033 | A1 | 11/2018 | Kislovskiy et al. |
| 2019/0016343 | A1 * | 1/2019 | Allen ............ G06Q 50/40 |
| 2019/0019122 | A1 | 1/2019 | Allen |
| 2019/0031097 | A1 * | 1/2019 | O'Herlihy ............ B60W 40/09 |
| 2019/0164229 | A1 * | 5/2019 | Sbianchi ............ G06Q 30/0282 |
| 2019/0212159 | A1 | 7/2019 | Petersen |
| 2019/0265948 | A1 | 8/2019 | Goyal et al. |
| 2019/0389483 | A1 | 12/2019 | Likhterman |
| 2020/0074492 | A1 | 3/2020 | Scholl et al. |
| 2020/0086882 | A1 | 3/2020 | Kodali |
| 2020/0152067 | A1 | 5/2020 | Salles et al. |
| 2020/0160251 | A1 | 5/2020 | Wynter et al. |
| 2020/0226690 | A1 | 7/2020 | Gulati et al. |
| 2020/0278685 | A1 * | 9/2020 | Jang ............ B60W 50/082 |
| 2021/0035224 | A1 * | 2/2021 | Crabtree ............ G06N 3/0472 |
| 2021/0097314 | A1 | 4/2021 | Scanlon |
| 2021/0166322 | A1 | 6/2021 | Allen et al. |
| 2021/0166323 | A1 | 6/2021 | Fields |
| 2021/0256616 | A1 | 8/2021 | Hayward |
| 2022/0036466 | A1 | 2/2022 | Harvey |
| 2022/0157094 | A1 * | 5/2022 | Moghtadai ............ G07C 5/008 |

OTHER PUBLICATIONS

Scola, "The Black Car Company That People Love to Hate: Cab Industry be Warned, Uber has Entered the System," Forefront Next City, Inc. Nov. 11, 2013 (Year: 2013).

* cited by examiner

SYSTEMS AND METHODS FOR GENERATING IMPROVED VEHICLE USAGE ANALYTICS BASED UPON VEHICLE SENSOR AND TELEMATICS DATA

CROSS-REFERENCE TO RELATED APPLICATIONS

This application claims the benefit of priority to U.S. Provisional Patent Application No. 62/892,853, filed Aug. 28, 2019, entitled "SYSTEMS AND METHODS FOR GENERATING IMPROVED VEHICLE USAGE ANALYTICS BASED UPON VEHICLE SENSOR AND TELEMATICS DATA", and to U.S. Provisional Patent Application No. 62/892,916, filed Aug. 28, 2019, entitled "SYSTEMS AND METHODS FOR GENERATING MOBILITY INSURANCE PRODUCTS USING RIDE-SHARING TELEMATICS DATA", and to U.S. Provisional Application No. 62/934,932, filed Nov. 13, 2019, entitled "SYSTEMS AND METHODS FOR GENERATING MOBILITY INSURANCE PRODUCTS USING RIDE-SHARING TELEMATICS DATA", and to U.S. Provisional Application No. 62/934,948, filed Nov. 13, 2019, entitled "SYSTEMS AND METHODS FOR GENERATING MOBILITY INSURANCE PRODUCTS USING RIDE-SHARING TELEMATICS DATA", the entire contents and disclosures of which are hereby incorporated by reference herein in their entirety.

FIELD OF THE INVENTION

The present disclosure relates to data analytics for vehicles and, more particularly, to systems and methods for generating improved vehicle usage analytics based upon vehicle sensor data and/or telematics data.

BACKGROUND

Connected vehicles are vehicles equipped with communications abilities (e.g., vehicle-to-infrastructure (V2I), vehicle-to-vehicle (V2V), and/or vehicle-to-network (V2N) communication). Such vehicles are increasingly common. Connected vehicles are often equipped with a variety of sensors that are potential sources of data (e.g., telematics data) regarding drivers of the connected vehicle and trips taken by the connected vehicle and/or an environment around the connected vehicle.

Individuals use mobile devices (e.g., mobile telephones) for a variety of purposes and often carry mobile devices while traveling. Such usage may be an additional source of data. For example, mobile devices may be equipped to generate data (e.g., telematics data) using instruments built into the mobile device, such as an accelerometer or global positioning system (GPS) device. This data obtained from connected cars and/or mobile devices may be useful for a variety of applications.

However, there are currently limitations in the ability of computing devices to utilize such data in automated processes. For example, known computing devices do not use sensor data obtained from connected vehicles, for example, to identify a driver or number of passengers of the vehicle, which may be useful in applications such as usage-based insurance, where an insurance premium is based upon an individual driver's actual driving behavior. Accordingly, in order to implement these applications, these different forms of information may need to be reconciled by human beings, which may result in lack of timeliness, inaccuracies, inconvenience, or other drawbacks.

BRIEF SUMMARY

The present embodiments may relate to, inter alia, systems and methods for generating improved vehicle usage analytics based upon vehicle sensor data and/or telematics data. In exemplary embodiments, the systems and methods may be performed by a vehicle analytics (VA) computing device. The VA computing device may collect and analyze telematics data (e.g., acceleration, position, velocity, orientation, etc.) and/or sensor data (e.g., data obtained from sensors onboard a vehicle) from a connected vehicle and/or mobile device associated with an individual in order to assess an individual's transportation behavior, and/or provide individualized insurance coverage options or incentives based upon the individual's transportation behavior. For example, the VA computing device may be capable of identifying a driver for an individual trip of a vehicle (e.g., a connected vehicle) and may assess the driving behavior of the identified driver for insurance purposes (e.g., calculating an insurance premium) using telematics data corresponding to the individual trip.

The systems and methods may also include building a trip database including information associated with a plurality of trips taken using a connected car and telematics data associated with each of the plurality of trips, and analyzing the trip data to determine transportation behavior of one or more identified drivers of the connected car. For example, the number of passengers present in the connected car for each trip may be determined.

The systems and methods may also include generating, using machine learning techniques, a driver profile model for an individual driver that characterizes the individual driver's driving behavior based upon, for example, telematics data. The driver profile may be used, for example, to identify the individual driver as a driver for a particular trip (e.g., of a connected car), calculate a premium for a usage-based insurance (UBI) policy associated with the individual driver, and/or generate recommendations to improve the individual driver's driving behavior (e.g., to drive more safely).

In one aspect, a vehicle analytics (VA) computing device may be provided. The VA computing device may include a processor (and/or associated transceiver) in communication with a memory device and a telematics device, and the processor (and/or associated transceiver) may be configured to: (1) receive, from the telematics device, telematics data corresponding to a vehicle; (2) identify a plurality of trips of the vehicle based upon the telematics data; (3) store the telematics data corresponding to each trip of the plurality of trips in a database in association with a trip identifier corresponding to the trip; (4) identify, for each trip of the plurality of trips, a driver of the vehicle based upon the telematics data; (5) store, in association with each trip identifier, a user identifier corresponding to the identified driver for the trip identifier; (6) parse, for each user identifier, the database to aggregate telematics data associated with the user identifier; and/or (7) calculate, for each user identifier, an insurance premium for an insurance policy (such as a UBI policy) associated with the user identifier based upon the aggregated telematics data corresponding to the user identifier. The VA computing device may include additional, less, or alternate functionality, including that discussed elsewhere herein.

In another aspect, a computer-implemented method may be provided. The computer-implemented method may be performed by a vehicle analytics (VA) computing device including a processor (and/or associated transceiver) in communication with a memory device and a telematics device. The computer-implemented method may include: (1) receiving, by the VA computing device, from the telematics device, telematics data corresponding to a vehicle; (2) identifying, by the VA computing device, a plurality of trips of the vehicle based upon the telematics data; (3) storing, by the VA computing device, the telematics data corresponding to each trip of the plurality of trips in a database in association with a trip identifier corresponding to the trip; (4) identifying, by the VA computing device, for each trip of the plurality of trips, a driver of the vehicle based upon the telematics data; (5) storing, by the VA computing device, in association with each trip identifier, a user identifier corresponding to the identified driver for the trip identifier; (6) parsing, by the VA computing device, for each user identifier, the database to aggregate telematics data associated with the user identifier; and/or (7) calculating, by the VA computing device, for each user identifier, an insurance premium for an insurance policy (such as a UBI policy) associated with the user identifier based upon the aggregated telematics data corresponding to the user identifier. The computer-implemented method may include additional, less, or alternate actions, including those discussed elsewhere herein.

In another aspect, at least one non-transitory computer-readable media having computer-executable instructions embodied thereon may be provided. When performed by a vehicle analytics (VA) computing device including a processor (and/or associated transceiver) in communication with a memory device and a telematics device, the computer-executable instructions may cause the processor (and/or associated transceiver) to: (1) receive, from the telematics device, telematics data corresponding to a vehicle; (2) identify a plurality of trips of the vehicle based upon the telematics data; (3) store the telematics data corresponding to each trip of the plurality of trips in a database in association with a trip identifier corresponding to the trip; (4) identify, for each trip of the plurality of trips, a driver of the vehicle based upon the telematics data; (5) store, in association with each trip identifier, a user identifier corresponding to the identified driver for the trip identifier; (6) parse, for each user identifier, the database to aggregate telematics data associated with the user identifier; and/or (7) calculate, for each user identifier, an insurance premium for an insurance policy (such as a UBI policy) associated with the user identifier based upon the aggregated telematics data corresponding to the user identifier. The computer-executable instructions may direct additional, less, or alternate functionality, including that discussed elsewhere herein.

In another aspect, a vehicle analytics (VA) computing device may be provided. The VA computing device may include a processor (and/or associated transceiver) in communication with a memory device and a connected vehicle, and the processor (and/or associated transceiver) may be configured to: (1) receive, from the connected vehicle, telematics data corresponding to the connected vehicle; (2) identify a plurality of trips of the vehicle based upon the telematics data; (3) store the telematics data corresponding to each trip of the plurality of trips in a database in association with a trip identifier corresponding to the trip; (4) determine, for each of the plurality of trips, a number of passengers present in the vehicle; (5) store the determined number of passengers in the database in association with the trip identifier corresponding to the trip; and/or (6) calculate an insurance premium associated with an insurance policy (such as a UBI policy) based upon the determined number of passengers in the vehicle. The VA computing device may include additional, less, or alternate functionality, including that discussed elsewhere herein.

In another aspect, a computer-implemented method may be provided. The computer-implemented method may be performed by a vehicle analytics (VA) computing device including a processor (and/or associated transceiver) in communication with a memory device and a connected vehicle. The computer-implemented method may include: (1) receiving, by the VA computing device, from the connected vehicle, telematics data corresponding to the connected vehicle; (2) identifying, by the VA computing device, a plurality of trips of the vehicle based upon the telematics data; (3) storing, by the VA computing device, the telematics data corresponding to each trip of the plurality of trips in a database in association with a trip identifier corresponding to the trip; (4) determining, by the VA computing device, for each of the plurality of trips, a number of passengers present in the vehicle; (5) storing, by the VA computing device, the determined number of passengers in the database in association with the trip identifier corresponding to the trip; and/or (6) calculating, by the VA computing device, an insurance premium associated with an insurance policy (such as a UBI policy) based upon the determined number of passengers in the vehicle. The computer-implemented method may include additional, less, or alternate actions, including those discussed elsewhere herein.

In another aspect, at least one non-transitory computer-readable media having computer-executable instructions embodied thereon may be provided. When executed by a vehicle analytics (VA) computing device including a processor (and/or associated transceiver) in communication with a memory device and a connected vehicle, the computer-executable instructions may cause the processor (and/or associated transceiver) to: (1) receive, from the connected vehicle, telematics data corresponding to the connected vehicle; (2) identify a plurality of trips of the vehicle based upon the telematics data; (3) store the telematics data corresponding to each trip of the plurality of trips in a database in association with a trip identifier corresponding to the trip; (4) determine, for each of the plurality of trips, a number of passengers present in the vehicle; (5) store the determined number of passengers in the database in association with the trip identifier corresponding to the trip; and/or (6) calculate an insurance premium associated with an insurance policy (such as a UBI policy) based upon the determined number of passengers in the vehicle. The computer-executable instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
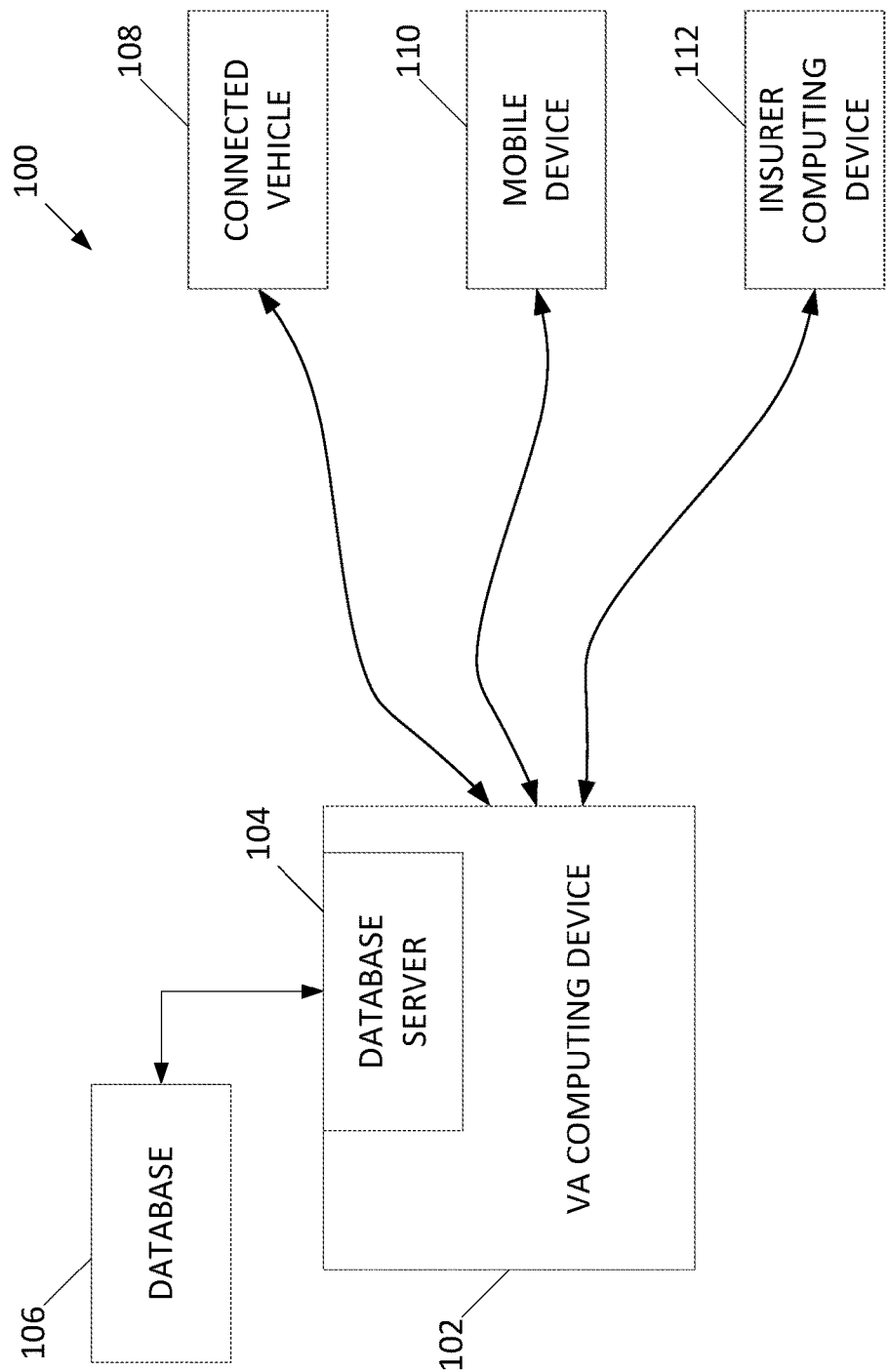
FIG. 1 depicts an exemplary vehicle analytics (VA) system in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for generating improved vehicle usage analytics based upon vehicle sensor data and/or telematics data. In exemplary embodiments, the systems and methods may be performed by a vehicle analytics (VA) computing device. The VA computing device may collect and analyze telematics data (e.g., acceleration, position, velocity, orientation, etc.) and/or sensor data (e.g., data obtained from sensors onboard a vehicle) from a connected vehicle and/or mobile device associated with an individual in order to assess an individual's transportation behavior, provide more individualized insurance coverage based upon the individual's specific transportation behavior, and/or provide individualized insurance coverage options or incentives based upon the individual's transportation behavior.

The systems and methods may include receiving telematics and/or sensor data from a telematics device (e.g., a connected vehicle or a mobile device) and identifying data corresponding to particular trips (e.g., trips taken using the connected vehicle). The identified sensor data and/or telematics data may be stored in a database in association with a trip identifier corresponding to the trip. For each trip, a driver may be identified. The identified driver may have a unique user identifier, which may be stored in the database in association with the trip identifier. Further, for each trip, a number of passengers in the vehicle (e.g., persons in the vehicle who are not driving the vehicle) may be determined. The determined number of passengers may be stored in the database in association with the trip identifier.

The systems and methods may also include generating, using machine learning techniques, a driver profile model for a user that characterizes the user's driving behavior based upon, for example, telematics data. The driver profile may be generated based upon telematics data associated with a user identifier in the database using, for example, machine learning techniques. The driver profile model may be used, for example, to identify the individual driver as a driver for subsequent trips and/or generate recommendations for the user to improve the individual driver's driving behavior (e.g., to drive more safely).

The systems and methods may also include calculating an insurance premium for a usage-based insurance (UBI) policy corresponding to a user and/or a vehicle (e.g., a connected vehicle). Telematics data and/or sensor data corresponding to trip identifiers associated with the user may be used to calculate an insurance premium for the user that depends on the user's actual transportation behavior (e.g., by distance driven, driving style, average number of passengers transported, and/or other factors related to driving risk). Accordingly, the calculated insurance premium may more accurately reflect an amount or risk associated with the user.

The systems and methods also include implementing a hybrid savings account (HSA) for a user. Because a usage-based insurance premium may vary, for example, based upon the user's driving behavior, the user may face increased difficulty in tracking an amount of money owed to and/or making payments to an insurance provider that is providing the usage-based insurance policy. To reduce this difficulty and help ensure that the usage-based insurance premium is adequately paid for each period, the user may deposit funds into the HSA. When a premium is calculated for the policy associated with a user, the calculated amount may be automatically transferred from the HSA to the insurance provider. In some example embodiments, funds may be transferred into the HSA from the insurance provider, for example, as a reward for complying with a generated recommendation for improving the user's driving behavior.

Receiving Sensor Data from Connected Vehicles

In one exemplary embodiment, sensor data from connected vehicles may be used to determine pricing for a usage-based insurance policy and/or generate recommendations to obtain and/or update usage-based insurance policies for users. A usage-based insurance policy is an insurance policy having a premium that depends on actual activity of a policy holder.

The VA computing device may be configured to receive sensor data from connected vehicles. Sensor data may include data stored on the connected vehicle (e.g., seat position settings, radio settings, vehicle diagnostic data, etc.)

and/or real-time data corresponding to the connected vehicle (e.g., accelerometer data, gyroscope data, GPS data, current seat position, current radio setting, current open/closed status of doors, current seats occupied, image and/or video data from interior and/or exterior cameras, identification of key fobs present in the vehicle, etc.). Such sensor data may have a variety of different applications, for example, in the context of usage-based insurance. For example, the VA computing device may use sensor data to analyze a driver's behavior to determine an insurance premium, identify the driver of a vehicle, and/or determine a number of passengers in a vehicle.

The VA computing device may receive the sensor data through a variety of different communication channels. For example, connected vehicles may be equipped, for example, with Bluetooth, cellular, and/or Wi-Fi connectivity that enables the connected vehicle to communicate with, for example, infrastructure (e.g., though a vehicle-to-infrastructure (V2I) connection), other connected vehicles (e.g., through a vehicle-to-vehicle (V2V) connection), or other computing devices (e.g., through a vehicle-to-network (V2N) connection). For example the connected vehicle may transmit sensor data via a cellular-based and/or WLAN-based (e.g., Wi-Fi) V2N connection to the VA computing device to enable the VA computing device to determine an insurance premium for a policy corresponding to the connected vehicle or its driver, identify the driver of the connected vehicle, and/or identify a number of passengers present in the connected vehicle.

The VA computing device may store the received sensor data, for example, in a database. The sensor data may be stored in association with an identifier corresponding to a particular driver, so that subsequently received sensor data may be compared to the stored sensor data, for example, to identify a driver and/or to identify patterns associated with a driver (e.g., driving style, routes taken, driver preferences, etc.).

Identifying a Driver Based Upon Sensor Data

In one exemplary embodiment, information obtained from sources such as an onboard computing device that stores driver preferences (e.g., power seat adjustment settings, radio settings), cameras, and connected key fobs may be used to identify the driver of a vehicle, for example, to apply an appropriate insurance policy to a trip.

The VA computing device may be configured to identify the driver of a vehicle for a trip based upon sensor data received from a connected vehicle. For example, the VA computing device may receive power seat settings, a current power seat position, radio settings, a current radio setting, camera data, a presence of a particular key fob or mobile device in the connected vehicle, or other sensor data from the connected vehicle and compare the received sensor data with historical sensor data that is associated with a particular driver. Historical sensor data may be, for example, sensor data associated with the driver obtained during previous trips. In some embodiments, the VA computing device may store and retrieve historical sensor data in a database that is in communication with the VA computing device. The historical sensor data may be stored in the database in association with an identifier corresponding to a particular driver. The VA computing device may identify the particular driver as the current driver of the vehicle if the current sensor data matches and/or otherwise corresponds to the historical sensor data.

In some embodiments, the VA computing device may use driver preferences (e.g., current and/or stored power seat and/or radio settings) to identify the driver of the vehicle for a trip. For example, the VA computing device may receive the current power seat setting and compare the current power seat setting to historical power seat settings stored in the database in association with identifiers corresponding to different drivers of the vehicle. If a historical power seat setting matches the current power seat setting, the VA computing device may determine that the driver associated with the matching historical seat setting is the current driver of the vehicle.

In some embodiments, the VA computing device may use connected devices (e.g., key fobs and/or mobile devices) present in the vehicle to identify the driver of the vehicle. For example, a key fob and/or mobile device may be associated with a particular driver of the vehicle. This association may be stored, for example, in the database. The VA computing device may receive an indicator from the vehicle that a particular key fob and/or mobile device is present in the vehicle and/or was used to operate the vehicle (e.g., unlocking and/or starting the vehicle). In response to receiving the indicator, the VA computing device may retrieve the identifier corresponding to the driver associated with the key fob and/or mobile device from the data base. Based upon the retrieved identifier, the VA computing device identify the driver associated with the key fob and/or mobile device as the current driver of the vehicle.

In some embodiments, the VA computing device may use camera data (e.g., image and/or video data from internal and/or external vehicle cameras). For example, the vehicle may be equipped with an internal, cabin-facing camera. The VA computing device may receive image and/or video data from the vehicle captured by the cabin-facing camera and use, for example, facial recognition to identify the current driver based upon the image and/or video data. For example, the VA computing device may compare the received image and/or video data to historical image and/or video data stored in association with the identifier corresponding to the driver in the database to identify the current driver of the vehicle.

In some embodiments, the VA computing device may use other data associated with a potential driver (e.g., calendar data) to determine that the potential driver is the current driver of the vehicle for a trip. For example, the VA computing device may receive calendar data (e.g., from the driver's mobile device) indicating the potential driver has an appointment at a particular location, and receive, from the vehicle, GPS data indicating that the vehicle is traveling to the same location. The VA computing device may match the calendar data and the GPS data to identify the potential driver as the current driver of the vehicle.

Generating a Driver Profile Model for Driver Identification

In one exemplary embodiment, telematics data may be used to train and apply a model that may be used to identify the driver of a vehicle, for example, to apply an appropriate insurance policy to a trip. The VA computing device may receive telematics data from a telematics device, which may be, for example, a mobile device, a connected vehicle, and/or another device capable of transmitting and collecting telematics data.

The VA computing device may be configured to generate a driver profile model corresponding to a particular driver based upon historical telematics data and/or sensor data obtained from, for example, a connected vehicle and/or mobile device associated with the particular driver. The historical telematics data may be stored, for example, in the database in communication with the VA computing device.

The VA computing device may generate the driver profile model during a training phase using, for example, machine learning techniques to identify patterns in telematics data corresponding to a user. During the training period, the VA computing device may receive telematics data corresponding to the user. The VA computing device may identify patterns in the received telematics data and associate the patterns with particular aspects (e.g., actions taken by the user). For example, the VA computing device may attempt to identify patterns in the telematics data that correspond to the user entering a vehicle on the driver side. The VA computing device may use the identified patterns to build the driver profile, so that upon completion of the training phase, the driver profile may be used to characterize subsequently received telematics data. For example, if subsequently received telematics data includes patterns matching patterns in the driver profile model that indicate the user is entering the vehicle on the driver side, the VA computing device may determine that the user is in fact entering the vehicle on the driver side.

In some embodiments, the VA computing device may utilize user feedback to verify the identified patterns during the training phase. For example, upon identifying a pattern in the telematics data that potentially corresponds to the user entering a vehicle on the driver side, the VA computing device may send the user a message asking the user to confirm that the user did in fact enter a vehicle on the driver side. For example, the VA computing device may also display a message in, for example, a mobile app, allowing the particular driver to verify that the driver did in fact enter and/or exit the vehicle to further reinforce the driver profile model. The VA computing device then may adapt the model based upon the user's response. For example, if the user responds in the affirmative, the VA computing device may weigh more heavily the identified pattern telematics data in making a determination that the action corresponding to the identified pattern actually occurred.

In some embodiments, the VA computing device may additionally or alternatively use sensor data to verify the identified patterns during the training phase. For example, the VA computing device may receive sensor data from the vehicle indicating that a driver door of the vehicle is opening and/or closing and determine that an opening and closing of the driver side door occurred at the same time as a pattern of telematics data identified as corresponding to the user entering the vehicle on the driver side. These two data sets can be used to validate that the identified pattern in fact corresponds to the user entering the vehicle on the driver side and be fed into the driver profile model.

In some embodiments, the VA computing device may develop the driver profile model to subsequently identify when a particular user is entering and/or exiting the vehicle to identify the user as an actual driver of a vehicle for a particular trip. The VA computing device may receive data from an accelerometer and/or other sensors on a mobile device associated with the user when the user is entering the vehicle on the driver side. Based upon the received telematics data and generated driver profile model, the VA computing device may determine that the user is entering the vehicle, and accordingly, the user is the actual driver of the vehicle during a trip of the vehicle immediately subsequent to the user entering the vehicle.

In some embodiments, the driver profile model may additionally or alternatively include, for example, driving style based upon telematics data, times when and/or locations where the driver typically drives, and/or other driver behaviors. In such embodiments, the VA computing device may validate each of these data sets using corresponding sensor data and/or driver verification in order to build the driver profile model. When the driver profile model has been built by the VA computing device, the VA computing device may compare telematics data received during a subsequent trip to the generated driver profile model to identify the particular driver as the driver of the vehicle. For example, if a current driver's driving style, route, and/or time and location matches a generated driver profile model corresponding to a user, the VA computing device may identify the user as the current driver of the vehicle.

Determining a Number of Passengers

In one exemplary embodiment, telematics data and/or sensor data may be used to determine a number of passengers that are in a vehicle during a trip, for example, to adjust insurance coverage for the trip accordingly (such as adjust UBI coverage for the trip).

The VA computing device may be configured to determine, for a trip, a number of passengers present in the vehicle based upon, for example, sensor data (e.g., door sensor data, active suspension systems, camera data, microphone data, airbag sensors, etc.). The VA computing device may store the determined number of passengers in the database in association with a trip identifier of the corresponding trip.

In some embodiments, the VA computing device may determine the number of passengers based upon door sensor data. For example, the VA computing device may receive door sensor data indicating that, prior to a trip, three doors of a four-door sedan were opened and closed. Assuming there is one driver, the VA computing device may determine based upon this data that there are two passengers in the vehicle for the trip.

In some embodiments, the VA computing device may determine the number of passengers based upon active suspension systems data. An active suspension system may be capable of determining weight data corresponding to a vehicle (e.g. the amount and/or distribution of weight within the vehicle). Because certain weight amounts and/or distributions may be associated with certain numbers of passengers in the vehicle, the VA computing device may receive such weight data from the active suspension system and determine the number of passengers based upon the received weight data.

In some embodiments, the VA computing device may determine the number of passengers based upon camera data (e.g., image and/or video data) and/or microphone data (e.g., audio data). For example, the vehicle may be equipped with an internal, cabin-facing camera. The VA computing device may receive image and/or video data from the vehicle captured by the cabin-facing camera and use, for example, facial recognition to determine the number of passengers upon the image and/or video data.

In some embodiments, the VA computing device may determine the number of passengers based upon airbag sensors. For example, the vehicle may include seats having sensors that sense when an individual of a certain threshold weight is present in the seat to activate airbags corresponding to the seat. The VA computing device may receive such data indicating that individuals are present in certain seats to determine the number of passengers.

Insurance Applications of Identifying a Driver and Determining a Number of Passengers for an Individual Trip In one exemplary embodiment, a determination of the driver of a vehicle for a trip and/or number of passengers for the trip may be used to calculate a premium for an insurance policy associated with the vehicle and/or the driver.

The VA computing device may be configured to analyze received telematics data and/or sensor data to identify trips associated with (e.g., taken using) the vehicle, so that the driver and/or number of passengers for each individual trip can be determined. For example, the VA computing device may identify a trip, for example, as a period from an engine start to an engine stop, as a period when the vehicle is traveling, or as another specific period of time corresponding to the vehicle being driven. The VA computing device may store a trip identifier and other data associated with the trip (e.g., telematics and/or sensor data) for each identified trip in the database.

The VA computing device may determine the driver and/or number of passengers associated with each identified trip, as described above. For each trip, the VA computing device may store the identified driver and/or number of passengers in the trip database in association with the corresponding trip. The VA computing device may further store telematics and/or sensor data associated with each identified trip in the trip database, so that each individual trip may be evaluated (e.g., for usage-based insurance).

The VA computing device may parse the data to identify trips associated with a certain particular user. The VA computing device may then, for example, calculate an insurance premium for an insurance policy associated with the particular driver, such as a usage-based insurance policy having a premium that depends on actual driving behavior. In some embodiments, the VA computing device may utilize, for example, machine learning techniques, to evaluate an amount of risk associated with a particular driving behavior (e.g., driving style, number of passengers typically transported, etc.) and calculate the premium based upon the determined amount of risk. In some embodiments, the VA computing device may utilize rules received from an insurer computing device to calculate the insurance premium. The VA computing device may transmit the calculated premium to the insurer computing device.

Insurance Applications of Developing a Driver Profile Model

In one exemplary embodiment, the generated driver profile may be used to determine a premium for an insurance policy, such as a UBI policy, and generate recommendations of driving behavior for the driver, for example, on how to drive more safely so as to reduce costs associated with insurance and/or potential collisions.

The VA computing device may be configured to calculate an insurance premium for an insurance policy associated with the particular driver based upon the generated driver profile. For example, an insurance premium for a usage-based insurance (UBI) policy may be calculated based upon the riskiness of a driver's actual driving behavior. The VA computing device may generate a score corresponding to the riskiness of the driver's behavior based upon the driver profile model and may calculate an insurance premium for a usage-based insurance policy based upon the generated score. Additionally or alternatively, the VA computing device may calculate a premium using the driver profile model, for example, based upon an amount of time and/or distance driven, a location driven, and/or data associated with other factors corresponding to risk posed by the driver's actual driving behavior.

In some embodiments, the VA computing device may be configured to generate a driver behavior recommendation for the driver based upon the driver profile model. For example, a driver's profile model may indicate that the driver routinely drives at safe for road and traffic conditions speeds, which is a safe driving behavior that may result in decreased insurance premiums or increased discounts. The VA computing device may generate a recommendation for the driver to continue to drive at safe speeds. In another example, if the driver drives at an excessive speed, the VA computing device may generate a recommendation for the drive slower. In such embodiments, the VA computing device may display the generated recommendation, for example, as a message in a mobile app (e.g., "Drive slower to increase your insurance savings."). Such messages may include other data and/or statistics (e.g., "You only save one minute but driving too fast for conditions increases gas usage and is less safe.").

Exemplary Hybrid Savings Account

In one exemplary embodiment, a hybrid savings account ("HSA") or "insurance savings plan" or "flex plan" may be used to fund the purchase of insurance products, such as a usage-based insurance policy. In particular, a user may establish a HSA at a financial institution associated with an insurance provider and/or in communication with an insurance provider. In the exemplary embodiment, the user registers for a HSA using the VA computing device. The user may use a user computing device (e.g., a mobile device) to communicate with the VA computing device to input or upload personal information to the VA computing device.

In some embodiments, the HSA may be an account under control or partial control of the insurance provider. For example, the insurance provider may be authorized to deduct from and/or credit to the HSA a predetermined amount or specified range. In the exemplary embodiment, the HSA may be administered by a financial institution in communication with the VA computing device where the VA computing device facilitates, coordinates, directs, manages, and/or otherwise determines appropriate transfer of funds from the user to and from the HSA and appropriate transfer of funds from the HSA to and from the insurance provider.

In the exemplary embodiment, the user may register with the financial institution and/or directly with the insurance provider to apply for and/or establish the HSA. In some embodiments, the insurance provider may host the VA computing device. In the exemplary, embodiment the VA computing device may be a remote server in communication with the insurance provider and at least one financial institution offering the HSA services. In the exemplary embodiment, the VA computing device may transmit instructions, code, commands, and/or other data to at least one insurance provider and at least one financial institution administrating the HSA (e.g., by the insurer computing device). Data transmitted to the insurance provider and/or financial institution may include at least registration information identifying the user applying for an insurance coverage product.

Upon registration by the user (e.g., via an online portal, app, by phone, or in person) the VA computing device and/or insurance provider may establish the HSA with a financial institution. In some embodiments, a pre-determined selection of financial institutions may be offered by the insurance provider and presented to the user by the VA computing device for selection by the user. Each financial institution may have a pre-arranged agreement with the insurance provider to act as a third party under a fiduciary obligation to safely and securely facilitate, manage, operate, and/or otherwise provide financial services consistent with the functionality of the HSA as described herein. In some embodiments, the user may independently apply for an HSA with a preferred financial institution, and the preferred financial institution may then communicate with the VA computing device and/or directly with the insurance provider to establish the HSA.

In the exemplary embodiment, the user may make periodic deposits to the HSA but may not withdraw funds from the HSA for a predetermined period of time (e.g., the duration of an insurance coverage period or other pre-arranged or agreed upon period of time). In some embodiments, the user may dictate, direct, and/or otherwise determine a type of savings and/or investment plan for the funds held in the HSA. For example, the user may be provided a limited selection of financial investment options, and may direct the funds held in the HSA to be invested in at least one of the provided investment options. In the exemplary embodiment, the user may direct funds held in the HSA for the purchase of certain insurance products offered by the insurance provider.

In the exemplary embodiment, funds held in the HSA may be used to purchase or are otherwise applied to insurance products (e.g., usage-based insurance) or services offered by the insurance provider. In one embodiment, a usage-based insurance product may include providing coverage by travel distance (e.g., feet, miles, kilometers, etc.). For example, as the user travels, coverage may be provided on a per-mile basis and a corresponding cost or per-mile fee may be calculated and subsequently deducted or withdrawn from the HSA. In other example embodiments, per-use insurance coverage or usage-based products, as described above, may be calculated based upon time, time period (per-minute, per-hour, per-hours, per-day, per-days, per-week, per-weeks, per-month, per-months, etc.), activity, participation, presence, location, and/or device, and/or be calculated based upon telematics data and/or sensor data obtained from, for example, a connected vehicle.

In the exemplary embodiment, the VA computing device may record and/or transmit each instance of use to the financial institution administrating the HSA for payment of usage-based insurance fees to the insurance provider. In the exemplary embodiment, the VA computing device may record use, for example, by storing telematics data in association with trip identifiers and user identifiers, as described above. The VA computing device may additionally communicate such data with the financial institution administrating the HSA and the insurance provider.

Upon expiration of the insurance cover period and/or termination of the insurance agreement, any excess and/or unused funds may be released or returned (e.g., refunded) to the user via a disbursement or by way of the insurance provider relinquishing control of the HSA by a lifting or removal of the restrictions or limitations on the HSA. In the exemplary embodiment, the user may be provided the option to renew or re-purchase the same or similar insurance product, and/or purchase an entirely new or different insurance product using the remaining funds in the HSA. In some cases, the user may need to and/or wish to add funds to the HSA to acquire or renew insurance coverage.

In some embodiments, renewal (e.g., re-purchase) of the insurance product may be automatic and/or automatic renewal may be optionally enabled by the user. In other embodiments, renewal may be automatic and the user may be provided the option to disable (e.g., opt-out) of automatic renewal. Renewal of the insurance coverage may include "rolling over" excess funds to the next coverage period whereby the excess funds are automatically applied to the purchase price of the insurance product offering. In some embodiments, insurance coverage may be automatically initiated, and any shortage or amounted owed by the user may be requested from the user. For example, the user may be billed and/or notified of any shortage and prompted to deposit additional funds into the HSA.

In some embodiments, insurance coverage may not be initiated until sufficient funds are deposited into the HSA. In some embodiments, additional payment sources may be linked to the HSA (e.g., credit card, debit card, bank account, etc.), and funds may be authorized for withdrawal from the other sources so that insurance coverage does not lapse.

In some embodiment, the VA computing device may credit or deduct from the HSA based upon an analysis of a trip taken by the vehicle. For example, if the VA computing device detects that a number of passengers in a vehicle would result in an increased premium, the VA computing device may deduct from an HSA associated with the user in order to cover the difference between the premium currently paid and the increase premium. In another example, the VA computing device may generate and send a recommendation to a user to drive slower. If the VA computing device detects, based upon telematics data associated with the user, that the user abides by the recommendation by driving slower, the VA computing device may credit an HSA associated with the user as a reward.

At least one of the technical problems addressed by this system may include: (i) inability of a computing device to determine a driver of a connected vehicle based upon telematics/and or sensor data obtained from the connected vehicle; (ii) inability of a computing device to determine a number of passengers in a vehicle based upon telematics/and or sensor data obtained from the connected vehicle; (iii) inability of a computing device to calculate an insurance premium based upon telematics/and or sensor data obtained from the connected vehicle; (iv) inability of a computing device to generate recommendations for drivers based upon based upon telematics/and or sensor data obtained from the connected vehicle; (v) inefficiency in automatically calculating an insurance premium for a vehicle because of an inability to identify a driver of a vehicle; (vi) inefficiency in automatically calculating an insurance premium for a trip of a vehicle because of an inability to identify a number of passengers present in the vehicle; (vii) inefficiency in drivers paying for the insurance product through associated hybrid savings accounts; (viii) inability to protect insurance providers against consumer default; and/or (ix) inability of a computing device to generate recommendations for drivers based upon their actual driving behavior.

A technical effect of the systems and processes described herein may be achieved by performing at least one of the following steps: (i) receiving, from the telematics device, telematics data corresponding to a vehicle; (ii) identifying a plurality of trips of the vehicle based upon the telematics data; (iii) storing the telematics data corresponding to each trip of the plurality of trips in a database in association with a trip identifier corresponding to the trip; (iv) identifying, for each trip of the plurality of trips, a driver of the vehicle based upon the telematics data; (v) storing, in association with each trip identifier, a user identifier corresponding to the identified driver for the trip identifier; (vi) parsing, for each user identifier, the database to aggregate telematics data associated with the user identifier; (vii) calculating, for each user identifier, an insurance premium for an insurance policy associated with the user identifier based upon the aggregated telematics data corresponding to the user identifier; (viii) receiving, from a connected vehicle, sensor data; (ix) comparing the received sensor data to historical sensor data stored in the database in association with a candidate user identifier to identify the candidate user identifier as corresponding to the driver of the vehicle; (x) generating, for a candidate user identifier, a driver profile model based upon historical telematics data associated with the candidate user identifier in the database; (xi) comparing the received telematics data to the generated driver profile model to identify the candidate user identifier as corresponding to the driver of the vehicle; (xii) receiving, from the telematics device, telematics data corresponding to the candidate user identifier; (xiii) generating, based upon a telematics data, a prediction of an attribute that corresponds to the telematics data; (xiv) verifying the prediction based upon an indicator input from a user to determine that the telematics data actually corresponds to the attribute; (xv) building the driver profile model by storing the attribute in association with the telematics data and the candidate user identifier in the database based upon the determination; (xvi) generating, for at least one user identifier of the plurality of user identifiers, a driver behavior recommendation based upon the driver profile model associated with the user identifier; (xvii) displaying the generated recommendation to a user associated with the user identifier; (xviii) transmitting the funds to a financial institution to be deposited into a hybrid savings account; (xix) transferring, from the hybrid savings account to an insurance provider, a payment of the calculated insurance premium corresponding to the user identifier of the user; (xx) receiving, from the connected vehicle, telematics data corresponding to the connected vehicle; (xxi) identifying a plurality of trips of the vehicle based upon the telematics data; (xxii) storing the telematics data corresponding to each trip of the plurality of trips in a database in association with a trip identifier corresponding to the trip; (xxiii) determining, for each of the plurality of trips, a number of passengers present in the vehicle; (xxiv) storing the determined number of passengers in the database in association with the trip identifier corresponding to the trip; and/or (xxv) calculating an insurance premium associated with an insurance policy based upon the determined number of passengers in the vehicle.

The technical effect achieved by this system may be at least one of: (i) ability of a computing device to determine a driver of a connected vehicle based upon telematics/and or sensor data obtained from the connected vehicle; (ii) ability of a computing device to determine a number of passengers in a vehicle based upon telematics/and or sensor data obtained from the connected vehicle; (iii) ability of a computing device to calculate an insurance premium based upon telematics/and or sensor data obtained from the connected vehicle; (iv) ability of a computing device to generate recommendations for drivers based upon telematics/and or sensor data obtained from the connected vehicle; (v) increased efficiency in automatically calculating an insurance premium for a vehicle based upon an ability to identify a driver of a vehicle; (vi) increased efficiency in automatically calculating an insurance premium for a trip of a vehicle based upon an ability to identify a number of passengers present in the vehicle; (vi) efficient means for drivers to pay for the insurance product through associated hybrid savings accounts; (viii) ability to protect insurance providers against consumer default; and/or (ix) inability of a computing device to generate recommendations for drivers based upon their actual driving behavior.

Exemplary System

FIG. 1 depicts an exemplary vehicle analytics (VA) system 100. VA system 100 may include a VA computing device 102 including a database server 104. VA computing device 102 may be in communication with a database 106 (e.g., a trip database), at least one connected vehicle 108, at least one mobile device 110, and an insurer computing device 112.

In one exemplary embodiment, sensor data from connected vehicles such as connected vehicle 108 may be used to determine pricing for a usage-based insurance policy and/or generate recommendations to obtain and/or update usage-based insurance policies for users. A usage-based insurance policy is an insurance policy having a premium that depends on actual activity of a policy holder.

VA computing device 102 may be configured to receive sensor data from connected vehicles such as connected vehicle 108. Sensor data may include data stored on connected vehicle 108 (e.g., seat position settings, radio settings, vehicle diagnostic data, etc.) and/or real-time data corresponding to the connected vehicle 108 (e.g., accelerometer data, gyroscope data, GPS data, current seat position, current radio setting, current open/closed status of doors, current seats occupied, image and/or video data from interior and/or exterior cameras, identification of key fobs present in the vehicle, etc.). Such sensor data may have a variety of different applications, for example, in the context of usage-based insurance. For example, VA computing device 102 may use sensor data to analyze a driver's behavior to determine an insurance premium, identify the driver of a vehicle, and/or determine a number of passengers in a vehicle.

VA computing device 102 may receive the sensor data through a variety of different communication channels. For example, connected vehicle 108 may be equipped, for example, with Bluetooth, cellular, and/or Wi-Fi connectivity that enables connected vehicle 108 to communicate with, for example, infrastructure (e.g., though a vehicle-to-infrastructure (V2I) connection), other connected vehicles 108 (e.g., through a vehicle-to-vehicle (V2V) connection), or other computing devices (e.g., through a vehicle-to-network (V2N) connection). For example connected vehicle 108 may transmit sensor data via a cellular-based and/or WLAN-based (e.g., Wi-Fi) V2N connection to VA computing device 102 to enable VA computing device 102 to determine an insurance premium for a policy corresponding to connected vehicle 108 or its driver, identify the driver of connected vehicle 108, and/or identify a number of passengers present in the connected vehicle 108.

VA computing device 102 may store the received sensor data, for example, in a database. The sensor data may be stored in association with an identifier corresponding to a particular driver, so that subsequently received sensor data may be compared to the stored sensor data, for example, to identify a driver and/or to identify patterns associated with a driver (e.g., driving style, routes taken, driver preferences, etc.).

In one exemplary embodiment, information obtained from sources such as an onboard computing device that stores driver preferences (e.g., power seat adjustment settings, radio settings), cameras, and connected key fobs may be used to identify the driver of a vehicle such as connected vehicle 108, for example, to apply an appropriate insurance policy to a trip.

VA computing device 102 may be configured to identify the driver of connected vehicle 108 for a trip based upon sensor data received from a connected vehicle. For example, VA computing device 102 may receive power seat settings, a current power seat position, radio settings, a current radio setting, camera data, a presence of a particular key fob or mobile device in connected vehicle 108, or other sensor data from connected vehicle 108 and compare the received sensor data with historical sensor data that is associated with a particular driver. Historical sensor data may be, for example, sensor data associated with the driver obtained during previous trips. In some embodiments, VA computing device 102 may store and retrieve historical sensor data in database 106. The historical sensor data may be stored in database 108 in association with an identifier corresponding to a particular driver (e.g., a user identifier). VA computing device 102 may identify the particular driver as the current driver of connected vehicle 108 if the current sensor data matches and/or otherwise corresponds to the historical sensor data.

In some embodiments, VA computing device 102 may use driver preferences (e.g., current and/or stored power seat and/or radio settings) to identify the driver of the vehicle for a trip. For example, VA computing device 102 may receive the current power seat setting and compare the current power seat setting to historical power seat settings stored in the database in association with identifiers corresponding to different drivers of the vehicle. If a historical power seat setting matches the current power seat setting, VA computing device 102 may determine that the driver associated with the matching historical seat setting is the current driver of connected vehicle 108.

In some embodiments, VA computing device 102 may use connected devices (e.g., key fobs and/or mobile devices) present in the vehicle to identify the driver of the vehicle. For example, a key fob and/or mobile device (e.g., mobile device 110) may be associated with a particular driver of the vehicle. This association may be stored, for example, in database 106. VA computing device 102 may receive an indicator from the vehicle that a particular key fob and/or mobile device is present in connected vehicle 108 and/or was used to operate connected vehicle 108 (e.g., unlocking and/or starting the vehicle). In response to receiving the indicator, VA computing device 102 may retrieve the identifier corresponding to the driver associated with the key fob and/or mobile device 110 from the data base. Based upon the retrieved identifier, VA computing device 102 may identify the driver associated with the key fob and/or mobile device 110 as the current driver of connected vehicle 108.

In some embodiments, VA computing device 102 may use camera data (e.g., image and/or video data from internal and/or external vehicle cameras). For example, connected vehicle 108 may be equipped with an internal, cabin-facing camera. VA computing device 102 may receive image and/or video data from connected vehicle 108 captured by the cabin-facing camera and use, for example, facial recognition to identify the current driver based upon the image and/or video data. For example, VA computing device 102 may compare the received image and/or video data to historical image and/or video data stored in association with the identifier corresponding to the driver stored in database 106 to identify the current driver of connected vehicle 108.

In some embodiments, VA computing device 102 may use other data associated with a potential driver (e.g., calendar data) to determine that the potential driver is the current driver of the vehicle for a trip. For example, VA computing device 102 may receive calendar data (e.g., from the driver's mobile device) indicating the potential driver has an appointment at a particular location, and receive, from the vehicle, GPS data indicating that the vehicle is traveling to the same location. VA computing device 102 may match the calendar data and the GPS data to identify the potential driver as the current driver of connected vehicle 108.

In one exemplary embodiment, telematics data may be used to train and apply a model that may be used to identify the driver of a vehicle, for example, to apply an appropriate insurance policy to a trip. VA computing device 102 may receive telematics data from a telematics device, which may be, for example, a mobile device, a connected vehicle, and/or another device capable of transmitting and collecting telematics data.

VA computing device 102 may be configured to generate a driver profile model corresponding to a particular driver based upon historical telematics data and/or sensor data obtained from, for example, connected vehicle 108 and/or mobile device 110 associated with the particular driver. The historical telematics data may be stored, for example, in database 106.

VA computing device 102 may generate the driver profile model during a training phase using, for example, machine learning techniques to identify patterns in telematics data corresponding to a user. During the training period, VA computing device 102 may receive telematics data corresponding to the user. VA computing device 102 may identify patterns in the received telematics data and associate the patterns with particular aspects (e.g., actions taken by the user). For example, VA computing device 102 may attempt to identify patterns in the telematics data that correspond to the user entering a vehicle on the driver side. VA computing device 102 may use the identified patterns to build the driver profile, so that upon completion of the training phase, the driver profile may be used to characterize subsequently received telematics data. For example, if subsequently received telematics data includes patterns matching patterns in the driver profile model that indicate the user is entering a vehicle (e.g., connected vehicle 108) on the driver side, VA computing device 102 may determine that the user is in fact entering the vehicle on the driver side.

In some embodiments, VA computing device 102 may utilize user feedback to verify the identified patterns during the training phase. For example, upon identifying a pattern in the telematics data that potentially corresponds to the user entering a vehicle on the driver side, VA computing device 102 may send the user a message asking the user to confirm that the user did in fact enter a vehicle on the driver side. For example, VA computing device 102 may also display a message in, for example, a mobile app operating on mobile device 110, allowing the particular driver to verify that the driver did in fact enter and/or exit the vehicle to further reinforce the driver profile model. VA computing device 102 then may adapt the model based upon the user's response. For example, if the user responds in the affirmative, VA computing device 102 may weigh more heavily the identified pattern telematics data in making a determination that the action corresponding to the identified pattern actually occurred.

In some embodiments, VA computing device 102 may additionally or alternatively use sensor data to verify the identified patterns during the training phase. For example, VA computing device 102 may receive sensor data from, for example, connected vehicle 108 indicating that a driver door of the vehicle is opening and/or closing and determine that an opening and closing of the driver side door occurred at the same time as a pattern of telematics data identified as corresponding to the user entering the vehicle on the driver side. These two data sets can be used to validate that the identified pattern in fact corresponds to the user entering the vehicle on the driver side and be fed into the driver profile model.

In some embodiments, VA computing device 102 may develop the driver profile model to subsequently identify when a particular user is entering and/or exiting the vehicle to identify the user as an actual driver of a vehicle for a particular trip. VA computing device 102 may receive data from an accelerometer and/or other sensors on mobile device 110 carried by the user when the user is entering the vehicle on the driver side. Based upon the received telematics data and generated driver profile model, VA computing device 102 may determine that the user is entering the vehicle, and accordingly, the user is the actual driver of the vehicle during a trip of the vehicle immediately subsequent to the user entering the vehicle.

In some embodiments, the driver profile model may additionally or alternatively include, for example, driving style based upon telematics data, times when and/or locations where the driver typically drives, and/or other driver behaviors. In such embodiments, VA computing device 102 may validate each of these data sets using corresponding sensor data and/or driver verification in order to build the driver profile model. When the driver profile model has been built by VA computing device 102, VA computing device 102 may compare telematics data received during a subsequent trip to the generated driver profile model to identify the particular driver as the driver of the vehicle. For example, if a current driver's driving style, route, and/or time and location matches a generated driver profile model corresponding to a user, VA computing device 102 may identify the user as the current driver of the vehicle.

In one exemplary embodiment, telematics data and/or sensor data may be used to determine a number of passengers that are in a vehicle during a trip, for example, to adjust insurance coverage for the trip accordingly.

VA computing device 102 may be configured to determine, for a trip, a number of passengers present in a vehicle (e.g., connected vehicle 108) based upon, for example, sensor data (e.g., door sensor data, active suspension systems, camera data, microphone data, airbag sensors, etc.). VA computing device 102 may store the determined number of passengers in database 106 in association with a trip identifier of the corresponding trip.

In some embodiments, VA computing device 102 may determine the number of passengers based upon door sensor data. For example, VA computing device 102 may receive door sensor data indicating that, prior to a trip, three doors of a four-door sedan were opened and closed. Assuming there is one driver, VA computing device 102 may determine based upon this data that there are two passengers in the vehicle for the trip.

In some embodiments, VA computing device 102 may determine the number of passengers based upon active suspension systems data. An active suspension system may be capable of determining weight data corresponding to a connected vehicle 108 (e.g. the amount and/or distribution of weight within the vehicle). Because certain weight amounts and/or distributions may be associated with certain numbers of passengers in the vehicle, VA computing device 102 may receive such weight data from the active suspension system and determine the number of passengers based upon the received weight data.

In some embodiments, VA computing device 102 may determine the number of passengers based upon camera data (e.g., image and/or video data) and/or microphone data (e.g., audio data). For example, connected vehicle 108 may be equipped with an internal, cabin-facing camera. VA computing device 102 may receive image and/or video data from the vehicle captured by the cabin-facing camera and use, for example, facial recognition to determine the number of passengers upon the image and/or video data.

In some embodiments, VA computing device 102 may determine the number of passengers based upon airbag sensors. For example, connected vehicle 108 may include seats having sensors that sense when an individual of a certain threshold weight is present in the seat to activate airbags corresponding to the seat. VA computing device 102 may receive such data indicating that individuals are present in certain seats to determine the number of passengers.

In one exemplary embodiment, a determination of the driver of a vehicle for a trip and/or number of passengers for the trip may be used to calculate a premium for an insurance policy associated with the vehicle and/or the driver.

VA computing device 102 may be configured to analyze received telematics data and/or sensor data to identify trips associated with (e.g., taken using) the vehicle, so that the driver and/or number of passengers for each individual trip can be determined. For example, VA computing device 102 may identify a trip, for example, as a period from an engine start to an engine stop, as a period when the vehicle is traveling, or as another specific period of time corresponding to the vehicle being driven. VA computing device 102 may store a trip identifier and other data associated with the trip (e.g., telematics and/or sensor data, and identified driver, and/or a determined number of passengers) for each identified trip in database 106.

VA computing device 102 may determine the driver and/or number of passengers associated with each identified trip, as described above. For each trip, VA computing device 102 may store the identified driver and/or number of passengers in database 106 in association with the corresponding trip. VA computing device 102 may further store telematics and/or sensor data associated with each identified trip in database 106, so that each individual trip may be evaluated (e.g., for usage-based insurance).

VA computing device 102 may parse the data to identify trips associated with a certain particular user. VA computing device 102 may then, for example, calculate an insurance premium for an insurance policy associated with the particular user, such as a usage-based insurance policy having a premium that depends on actual driving behavior. In some embodiments, VA computing device 102 may utilize, for example, machine learning techniques, to evaluate an amount of risk associated with a particular driving behavior (e.g., driving style, number of passengers typically transported, etc.) and calculate the premium based upon the determined amount of risk. In some embodiments, VA computing device 102 may utilize rules received from insurer computing device 112 to calculate the insurance premium. VA computing device 102 may transmit the calculated premium to insurer computing device 112.

In one exemplary embodiment, the generated driver profile may be used to determine a premium for an insurance policy and generate recommendations of driving behavior for the driver, for example, on how to drive more safely so as to reduce costs associated with insurance and/or potential collisions.

VA computing device 102 may be configured to calculate an insurance premium for an insurance policy associated with the particular driver based upon the generated driver profile. For example, an insurance premium for a usage-based insurance policy may be calculated based upon the riskiness of a driver's actual driving behavior. VA computing device 102 may generate a score corresponding to the riskiness of the driver's behavior based upon the driver profile model and may calculate an insurance premium for a usage-based insurance policy based upon the generated score. Additionally or alternatively, VA computing device 102 may calculate a premium using the driver profile model, for example, based upon an amount of time and/or distance driven, a location driven, and/or data associated with other factors corresponding to risk posed by the driver's actual driving behavior.

In some embodiments, VA computing device 102 may be configured to generate a driver behavior recommendation for the driver based upon the driver profile model. For example, a driver's profile model may indicate that the driver often drives at reasonable speeds for given road, traffic, or weather conditions, or may otherwise indicate unsafe driving behavior. Additionally or alternatively, a driver's profile model may indicate that the driver often drives at excessive speeds for given road, traffic, or weather conditions, or may otherwise indicate unsafe driving behavior. In such a scenario, VA computing device 102 may generate a recommendation for the driver to drive slower. In such embodiments, VA computing device 102 may display the generated recommendation, for example, as a message in a mobile app running on mobile device 110 (e.g., "Drive slower to increase your insurance discount."). Such messages may include other data and/or statistics (e.g., "You only save one minute, but driving at excessive speeds increases gas usage and is less safe.").

In one exemplary embodiment, a hybrid savings account ("HSA") or "insurance savings plan" or "flex plan" may be used to fund the purchase of insurance products, such as a usage-based insurance policy. In particular, a user may establish an HSA at a financial institution associated with an insurance provider and/or in communication with an insurance provider. In the exemplary embodiment, the user registers for an HSA using VA computing device 102. The user may use a user computing device (e.g., mobile device 110) to communicate with VA computing device 102 to input or upload personal information to VA computing device 102.

In some embodiments, the HSA may be an account under control or partial control of the insurance provider. For example, the insurance provider may be authorized to deduct from and/or credit to the HSA a predetermined amount or specified range. In the exemplary embodiment, the HSA may be administered by a financial institution in communication with VA computing device 102 where VA computing device 102 facilitates, coordinates, directs, manages, and/or otherwise determines appropriate transfer of funds from the user to and from the HAS, and appropriate transfer of funds from the HSA to and from the insurance provider.

In the exemplary embodiment, the user may register with the financial institution and/or directly with the insurance provider to apply for and/or establish the HSA. In some embodiments, the insurance provider may host VA computing device 102. In the exemplary embodiment, VA computing device 102 may be a remote server in communication with the insurance provider and at least one financial institution offering the HSA services. In the exemplary embodiment, VA computing device 102 may transmit instructions, code, commands, and/or other data to at least one insurance provider and at least one financial institution administrating the HSA (e.g., by insurer computing device 114). Data transmitted to the insurance provider and/or financial institution may include at least registration information identifying the user applying for an insurance coverage product.

Upon registration by the user (e.g., via an online portal, app, by phone, or in person) VA computing device 102 and/or insurance provider may establish the HSA with a financial institution. In some embodiments, a pre-determined selection of financial institutions may be offered by the insurance provider and presented to the user by VA computing device 102 for selection by the user. Each financial institution may have a pre-arranged agreement with the insurance provider to act as a third party under a fiduciary obligation to safely and securely facilitate, manage, operate, and/or otherwise provide financial services consistent with the functionality of the HSA as described herein. In some embodiments, the user may independently apply for an HSA with a preferred financial institution, and the preferred financial institution may then communicate with VA computing device 102 and/or directly with the insurance provider to establish the HSA.

In the exemplary embodiment, the user may make periodic deposits to the HSA but may not withdraw funds from the HSA for a predetermined period of time (e.g., the duration of an insurance coverage period or other pre-arranged or agreed upon period of time). In some embodiments, the user may dictate, direct, and/or otherwise determine a type of savings and/or investment plan for the funds held in the HSA. For example, the user may be provided a limited selection of financial investment options and may direct the funds held in the HSA to be invested in at least one of the provided investment options. In the exemplary embodiment, the user may direct funds held in the HSA for the purchase of certain insurance products offered by the insurance provider.

In the exemplary embodiment, funds held in the HSA may be used to purchase or are otherwise applied to insurance products (e.g., usage-based insurance) or services offered by the insurance provider. In one embodiment, a usage-based insurance product may include providing coverage by travel distance (e.g., feet, miles, kilometers, etc.). For example, as the user travels, coverage may be provided on a per-mile basis and a corresponding cost or per-mile fee may be calculated and subsequently deducted or withdrawn from the HSA. In other example embodiments, per-use insurance coverage or usage-based products, as described above, may be calculated based upon time, time period (such as per-hour, per-day, per-week, per-month, etc.), activity, participation, presence, location, and/or device, and/or be calculated based upon telematics data and/or sensor data obtained from, for example, a connected vehicle.

In the exemplary embodiment, VA computing device 102 may record and/or transmit each instance of use to the financial institution administrating the HSA for payment of usage-based insurance fees to the insurance provider. In the exemplary embodiment, VA computing device 102 may record use, for example, by storing telematics data in association with trip identifiers and user identifiers, as described above. VA computing device 102 may additionally communicate such data with the financial institution administrating the HSA and the insurance provider.

Upon expiration of the insurance cover period and/or termination of the insurance agreement, any excess and/or unused funds may be released or returned (e.g., refunded) to the user via a disbursement or by way of the insurance provider relinquishing control of the HSA by a lifting or removal of the restrictions or limitations on the HSA. In the exemplary embodiment, the user may be provided the option to renew or re-purchase the same or similar insurance product and/or purchase an entirely new or different insurance product using the remaining funds in the HSA. In some cases, the user may need to and/or wish to add funds to the HSA to acquire or renew insurance coverage.

In some embodiments, renewal (e.g., re-purchase) of the insurance product may be automatic and/or automatic renewal may be optionally enabled by the user. In other embodiments, renewal may be automatic and the user may be provided the option to disable (e.g., opt-out) of automatic renewal. Renewal of the insurance coverage may include "rolling over" excess funds to the next coverage period whereby the excess funds are automatically applied to the purchase price of the insurance product offering.

In some embodiments, insurance coverage may be automatically initiated, and any shortage or amounted owed by the user may be requested from the user. For example, the user may be billed and/or notified of any shortage and prompted to deposit additional funds into the HSA. In some embodiments, insurance coverage may not be initiated until sufficient funds are deposited into the HSA. In some embodiments, additional payment sources may be linked to the HSA (e.g., credit card, debit card, bank account, etc.), and funds may be authorized for withdrawal from the other sources so that insurance coverage does not lapse.

In some embodiment, VA computing device 102 may credit or deduct from the HSA based upon an analysis of a trip taken by the vehicle. For example, if VA computing device 102 detects that a number of passengers in a vehicle would result in an increased premium, VA computing device 102 may deduct from an HSA associated with the user in order to cover the difference between the premium currently paid and the increase premium. In another example, VA computing device 102 may generate and send a recommendation to a user to drive slower. If VA computing device 102 detects, based upon telematics data associated with the user, that the user abides by the recommendation by driving slower, VA computing device 102 may credit an HSA associated with the user as a reward or discount.

Exemplary Client Computing Device

Figure 2:
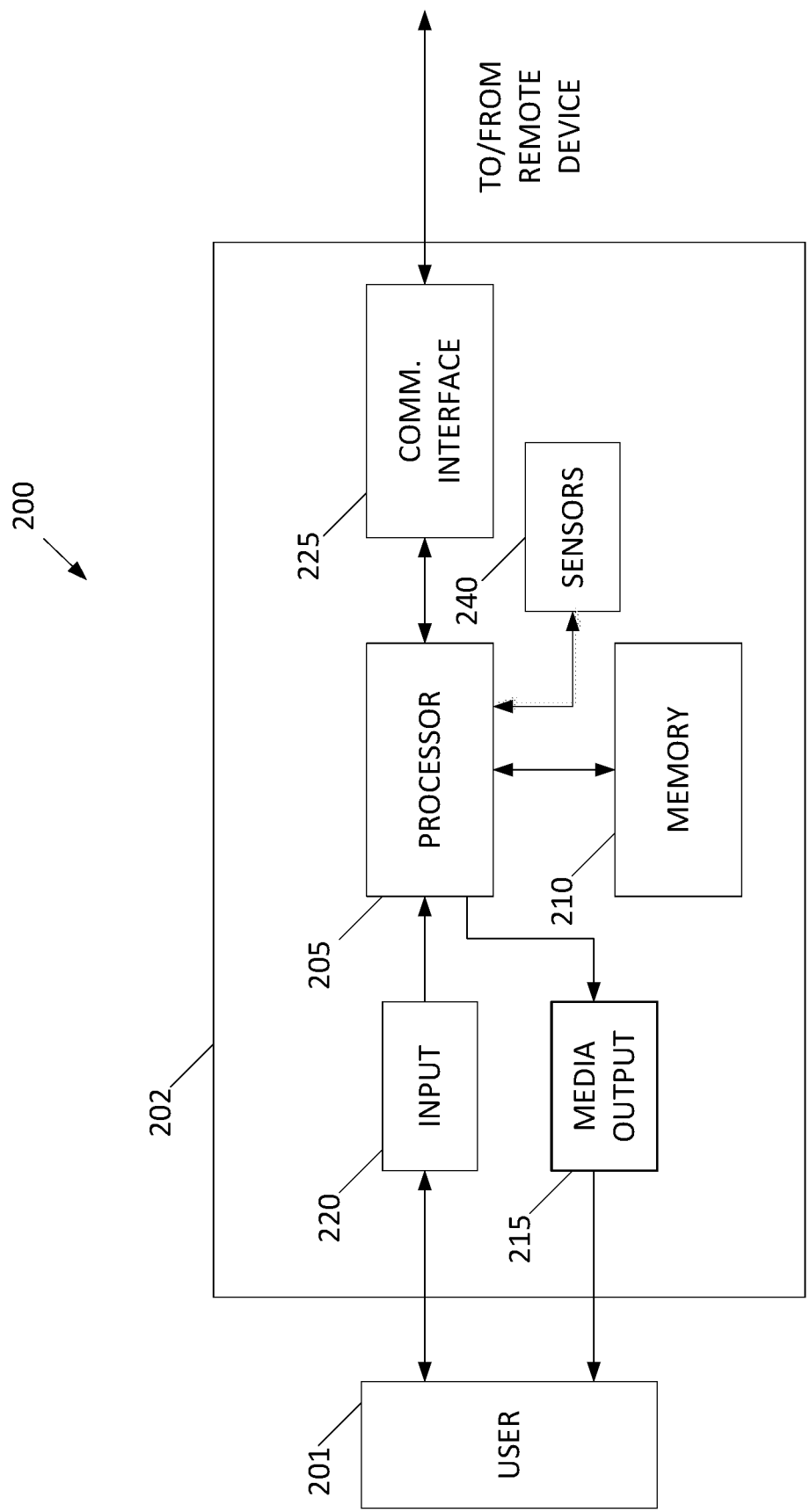
FIG. 2 depicts an exemplary client computing device that may be used with the VA system illustrated in FIG. 1.

FIG. 2 depicts an exemplary client computing device 202. Client computing device 202 may be, for example, at least one of VA computing device 102, connected vehicle 108, mobile device 110 and/or insurer computing device 112 (all shown in FIG. 1).

Client computing device 202 may include a processor 205 for executing instructions. In some embodiments, executable instructions may be stored in a memory area 210. Processor 205 may include one or more processing units (e.g., in a multi-core configuration). Memory area 210 may be any device allowing information such as executable instructions and/or other data to be stored and retrieved. Memory area 210 may include one or more computer readable media.

In exemplary embodiments, client computing device 202 may also include at least one media output component 215 for presenting information to a user 201. Media output component 215 may be any component capable of conveying information to user 201. In some embodiments, media output component 215 may include an output adapter such as a video adapter and/or an audio adapter. An output adapter may be operatively coupled to processor 205 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones).

Client computing device 202 may also include an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

Client computing device 202 may also include a communication interface 225, which can be communicatively coupled to a remote device such as VA computing device 102 (shown in FIG. 1). Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

In some embodiments, client computing device 202 may also include sensors 240. Sensors 240 may include, for example, an accelerometer, a global positioning system (GPS), or a gyroscope. Sensors 240 may be used to collect telematics data, which may be transmitted by client computing device 202 a remote device such as VA computing device 102 (shown in FIG. 1).

Stored in memory area 210 may be, for example, computer readable instructions for providing a user interface to user 201 via media output component 215 and, optionally, receiving and processing input from input device 220. A user interface may include, among other possibilities, a web browser and client application. Web browsers may enable users, such as user 201, to display and interact with media and other information typically embedded on a web page or a website. A client application may allow user 201 to interact with a server application from VA computing device 102 (shown in FIG. 1).

Memory area 210 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Server System

Figure 3:
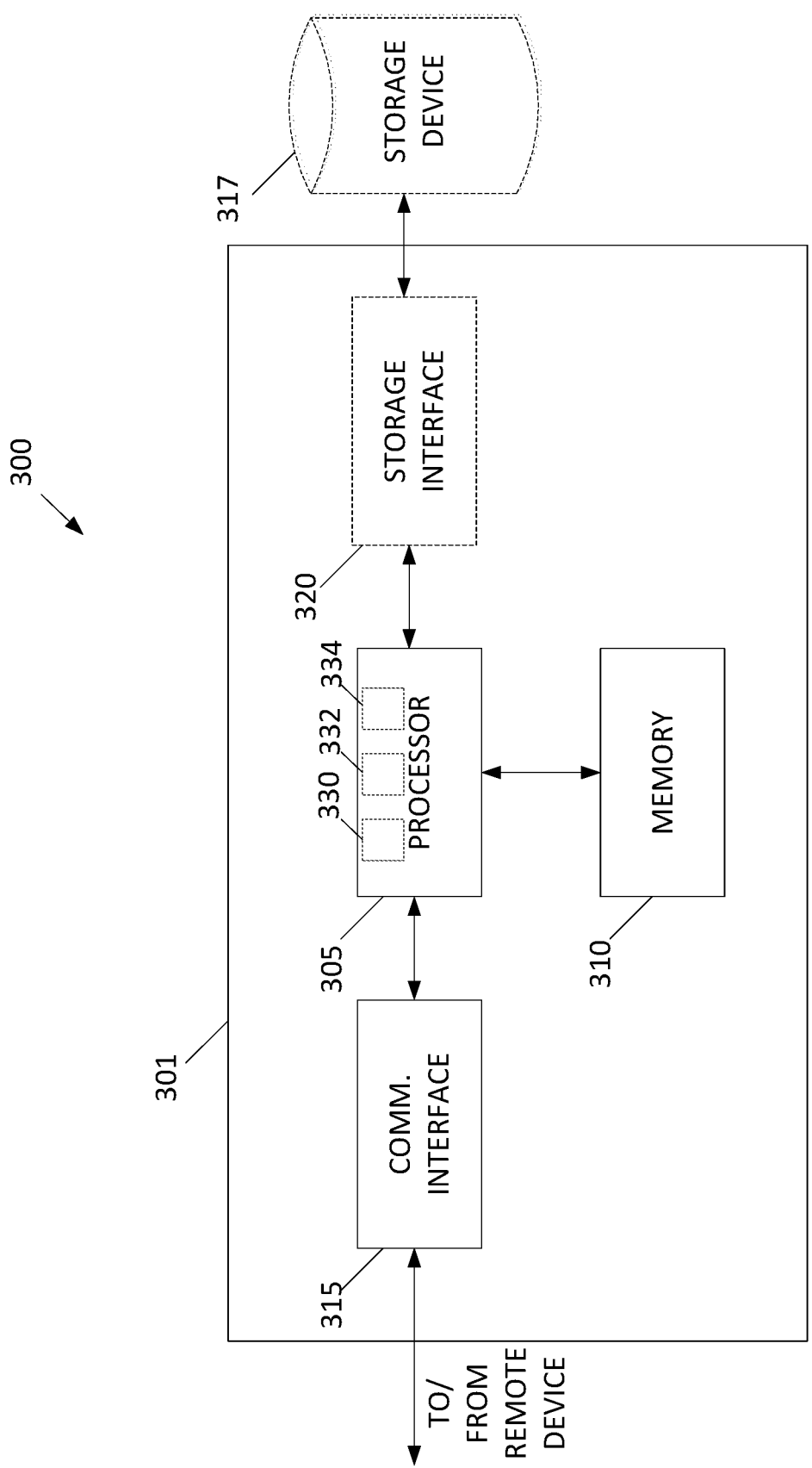
FIG. 3 depicts an exemplary server system that may be used with the VA system illustrated in FIG. 1.

FIG. 3 depicts an exemplary server system that may be used with VA system 100 illustrated in FIG. 1. Server system 301 may be, for example, VA computing device 102 (shown in FIG. 1).

In exemplary embodiments, server system 301 may include a processor 305 for executing instructions. Instructions may be stored in a memory area 310. Processor 305 may include one or more processing units (e.g., in a multi-core configuration) for executing instructions. The instructions may be executed within a variety of different operating systems on server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 may be operatively coupled to a communication interface 315 such that server system 301 is capable of communicating with connected vehicle 108, mobile device 110, insurer computing device 112 (all shown in FIG. 1), or another server system 301. For example, communication interface 315 may receive requests from mobile device 110 via the Internet.

Processor 305 may also be operatively coupled to a storage device 317, such as database 106 (shown in FIG. 1). Storage device 317 may be any computer-operated hardware suitable for storing and/or retrieving data. In some embodiments, storage device 317 may be integrated in server system 301. For example, server system 301 may include one or more hard disk drives as storage device 317.

In other embodiments, storage device 317 may be external to server system 301 and may be accessed by a plurality of server systems 301. For example, storage device 317 may include multiple storage units such as hard disks or solid state disks in a redundant array of inexpensive disks (RAID) configuration. Storage device 317 may include a storage area network (SAN) and/or a network attached storage (NAS) system.

In some embodiments, processor 305 may be operatively coupled to storage device 317 via a storage interface 320. Storage interface 320 may be any component capable of providing processor 305 with access to storage device 317. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 317.

In exemplary embodiments, processor 305 may include and/or be communicatively coupled to one or more modules for implementing the systems and methods described herein. Processor 305 may include a communication module 330 that may be configured to receive, from the telematics device, telematics data corresponding to a vehicle. Processor 305 may further include an analytics module 332 that may be configured to identify a plurality of trips of the vehicle based upon the telematics data, identify, for each trip of the plurality of trips, a driver of the vehicle based upon the telematics data, and/or calculating, for each user identifier, an insurance premium for an insurance policy associated with the user identifier based upon the aggregated telematics data corresponding to the user identifier.

Processor 305 may further include a data management module 334 that may be configured to store the telematics data corresponding to each trip of the plurality of trips in a database (e.g., database 106) in association with a trip identifier corresponding to the trip, store, in association with each trip identifier, a user identifier corresponding to the identified driver for the trip identifier, and/or parse, for each user identifier, the database to aggregate telematics data associated with the user identifier. Communication module 330, analytics module 332, and data management module 334 may include additional, less, or alternate functionality, including that discussed elsewhere herein.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Connected Vehicle

Figure 4:
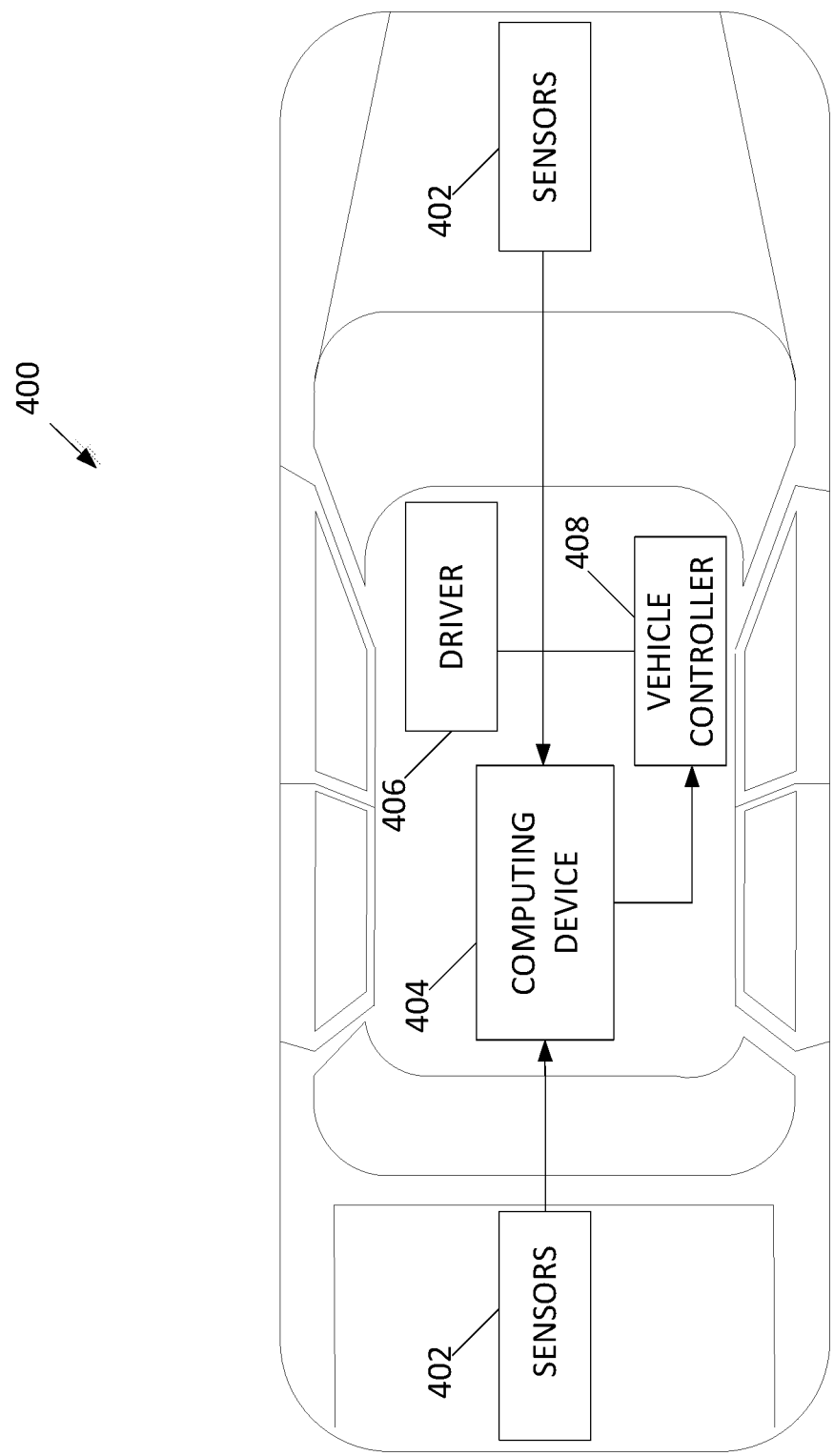
FIG. 4 depicts an exemplary connected vehicle that may be used with the VA system illustrated in FIG. 1.

FIG. 4 depicts an exemplary connected vehicle 400. Connected vehicle 400 may be, for example, connected vehicle 110 (shown in FIG. 1).

Connected vehicle 400 may include a plurality of sensors 402 and a computing device 404. Sensors 402 may include, but are not limited to, temperature sensors, terrain sensors, weather sensors, accelerometers, gyroscopes, radar, LIDAR, Global Positioning System (GPS), video devices, imaging devices, cameras (e.g., 2D and 3D cameras), audio recorders, and computer vision. In some embodiments, sensors 402 may be used to collect, for example, vehicle telematics data, as described above. In addition, sensors 402 may be used to collect additional information, for example, a current seat position, a current radio setting, a current open/closed status of doors, current seats occupied, image and/or video data from interior and/or exterior cameras, and/or identification of key fobs present in the vehicle.

Such telematics data and/or sensor data collected by sensors 402 may be transmitted to computing device 102 (shown in FIG. 1). The telematics data/and or sensor data may be transmitted, for example, through a cellular-based or WLAN-based V2V, V2I, or V2N connection.

Computing device 404 may be implemented, for example, as client computing device 202 (shown in FIG. 2). In exemplary embodiments, computing device 404 may receive data from sensors 402. In embodiments where VA computing device 102 is remote from connected vehicle 400, computing device 404 may transmit data received from sensors 402 (e.g., vehicle telematics data) to VA computing device 102. Alternatively, VA computing device 102 may be implemented as computing device 404.

In exemplary embodiments, vehicle controller 408 may control at least some operation of connected vehicle 400. For example, vehicle controller 408 may steer, accelerate, or decelerate connected vehicle 400 based upon data received, for example, from sensors 402. In some embodiments, vehicle controller 408 may include a display screen or touchscreen (not shown) that is capable of displaying information to and/or receiving input from driver 406.

In other embodiments, vehicle controller 408 may be capable of wirelessly communicating with a user device such as mobile device 110 in connected car 400. In these embodiments, vehicle controller 408 may be capable of communicating with the user of mobile device 110, such as driver 406, through an application on mobile device 110. In some embodiments, computing device 404 may include vehicle controller 408.

Figure 5:
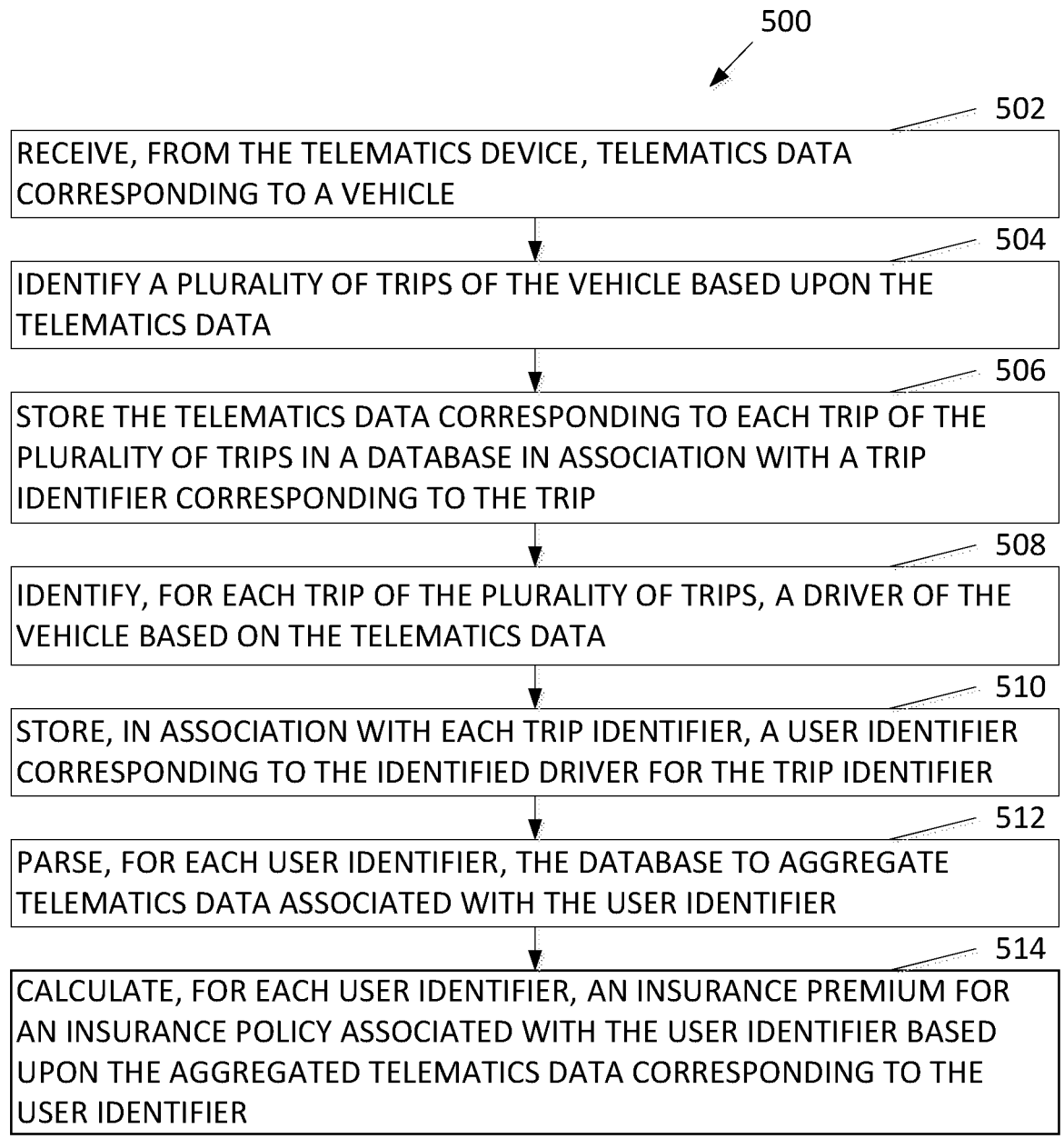
FIG. 5 illustrates an exemplary computer-implemented method for determining an insurance premium of a driver identified by the VA system that may be performed by the VA system illustrated in FIG. 1.

Exemplary Method for Determining an Insurance Premium of a Driver Identified by the VA System FIG. 5 illustrates an exemplary computer-implemented method 500 for determining an insurance premium of a driver identified by the VA system that may be may be implemented using one or more components of VA system 100 (shown in FIG. 1).

Computer-implemented method 500 may include receiving 502, from the telematics device, telematics data corresponding to a vehicle. In some embodiments, receiving 502 telematics data may be performed by VA computing device 102, such as by executing communication module 330 (shown in FIG. 3). In some embodiments, the telematics device is a connected vehicle (e.g., connected vehicle 108).

Computer-implemented method 500 may further include identifying 504 a plurality of trips of the vehicle based upon the telematics data. In some embodiments, identifying 504 the plurality of trips may be performed by VA computing device 102, such as by executing analytics module 332 (shown in FIG. 3).

Computer-implemented method 500 may further include storing 506 the telematics data corresponding to each trip of the plurality of trips in a database (e.g., database 106) in association with a trip identifier corresponding to the trip. In some embodiments, storing 506 the telematics data may be performed by VA computing device 102, such as by executing data management module 334 (shown in FIG. 3).

Computer-implemented method 500 may further include identifying 508, for each trip of the plurality of trips, a driver of the vehicle based upon the telematics data. In some embodiments, identifying 508 the driver may be performed by VA computing device 102, such as by executing analytics module 332 (shown in FIG. 3). In some embodiments, identifying 508 the driver of the vehicle may include receiving, from the connected vehicle, sensor data, and comparing the received sensor data to historical sensor data stored in the database in association with a candidate user identifier to identify the candidate user identifier as corresponding to the driver of the vehicle.

In such embodiments, the sensor data may include at least one of seat position settings, radio settings, camera data, and key fob data. Additionally or alternatively, identifying 508 the driver may include generating, for a candidate user identifier, a driver profile model based upon historical telematics data associated with the candidate user identifier in the database, and comparing the received telematics data to the generated driver profile model to identify the candidate user identifier as corresponding to the driver of the vehicle.

Computer-implemented method 500 may further include storing 510, in association with each trip identifier, a user identifier corresponding to the identified driver for the trip identifier. In some embodiments, storing 510 the user identifier may be performed by VA computing device 102, such as by executing data management module 334 (shown in FIG. 2).

Computer-implemented method 500 may further include parsing 512, for each user identifier, the database to aggregate telematics data associated with the user identifier. In some embodiments, parsing 512 the database may be performed by VA computing device 102, such as by executing data management module 334 (shown in FIG. 3).

Computer-implemented method 500 may further include calculating 514, for each user identifier, an insurance premium for an insurance policy (such as UBI policy) associated with the user identifier based upon the aggregated telematics data corresponding to the user identifier. In some embodiments, calculating 514 the insurance premium may be performed by VA computing device 102, such as by executing analytics module 332 (shown in FIG. 3). In some embodiments, method 500 may further include determining, for each trip, a number of passengers present in the vehicle, storing the determined number of passengers in the database in association with the trip identifier corresponding to the trip, and calculating, for each user identifier, the insurance premium further based upon the determined number of passengers in the vehicle for each trip identifier associated with the user identifier.

Figure 6:
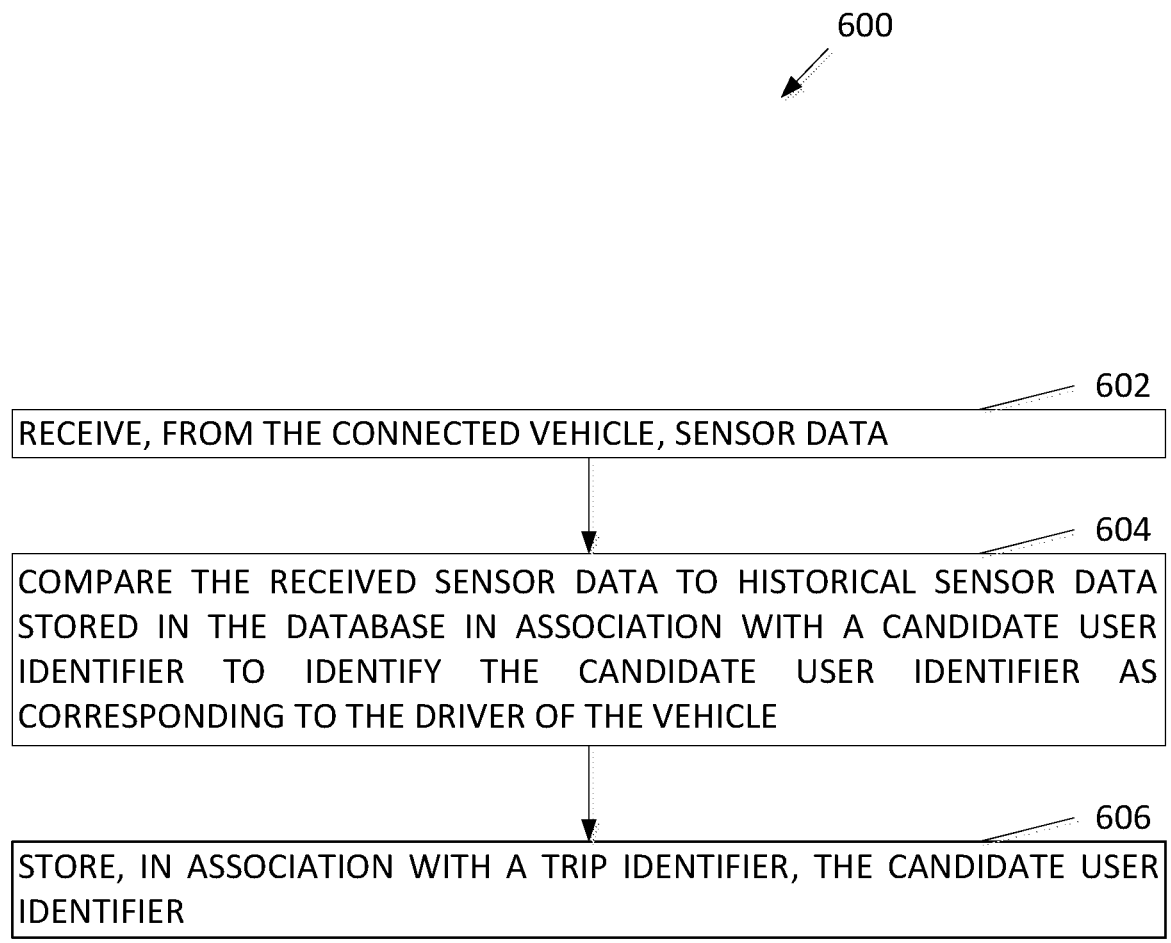
FIG. 6 illustrates an exemplary computer-implemented method for identifying a driver using sensor data obtained from a connected vehicle that may be performed by the VA system illustrated in FIG. 1.

Exemplary Method for Identifying a Driver Using Sensor Data Obtained from a Connected Vehicle FIG. 6 illustrates an exemplary computer-implemented method 600 for identifying a driver using sensor data obtained from a connected vehicle that may be may be implemented using one or more components of the VA system 100 (shown in FIG. 1).

Computer-implemented method 600 may include receiving 602, from the connected vehicle, sensor data. In some embodiments, receiving 602 the sensor data may be performed by VA computing device 102, such as by executing communication module 330 (shown in FIG. 3). In some embodiments, the sensor data includes at least one of seat position settings, radio settings, camera data, and key fob data.

Computer-implemented method 600 may also include comparing 604 the received sensor data to historical sensor data stored in the database in association with a candidate user identifier to identify the candidate user identifier as corresponding to the driver of the vehicle. In some embodiments, comparing 604 the received sensor data to the historical sensor data may be performed by VA computing device 102, such as by executing analytics module 332 (shown in FIG. 3).

Computer-implemented method 600 may further include storing 606, in association with a trip identifier, the candidate user identifier. In some embodiments, storing 606 the candidate identifier may be performed by VA computing device 102, such as by executing data management module 334 (shown in FIG. 3).

Figure 7:
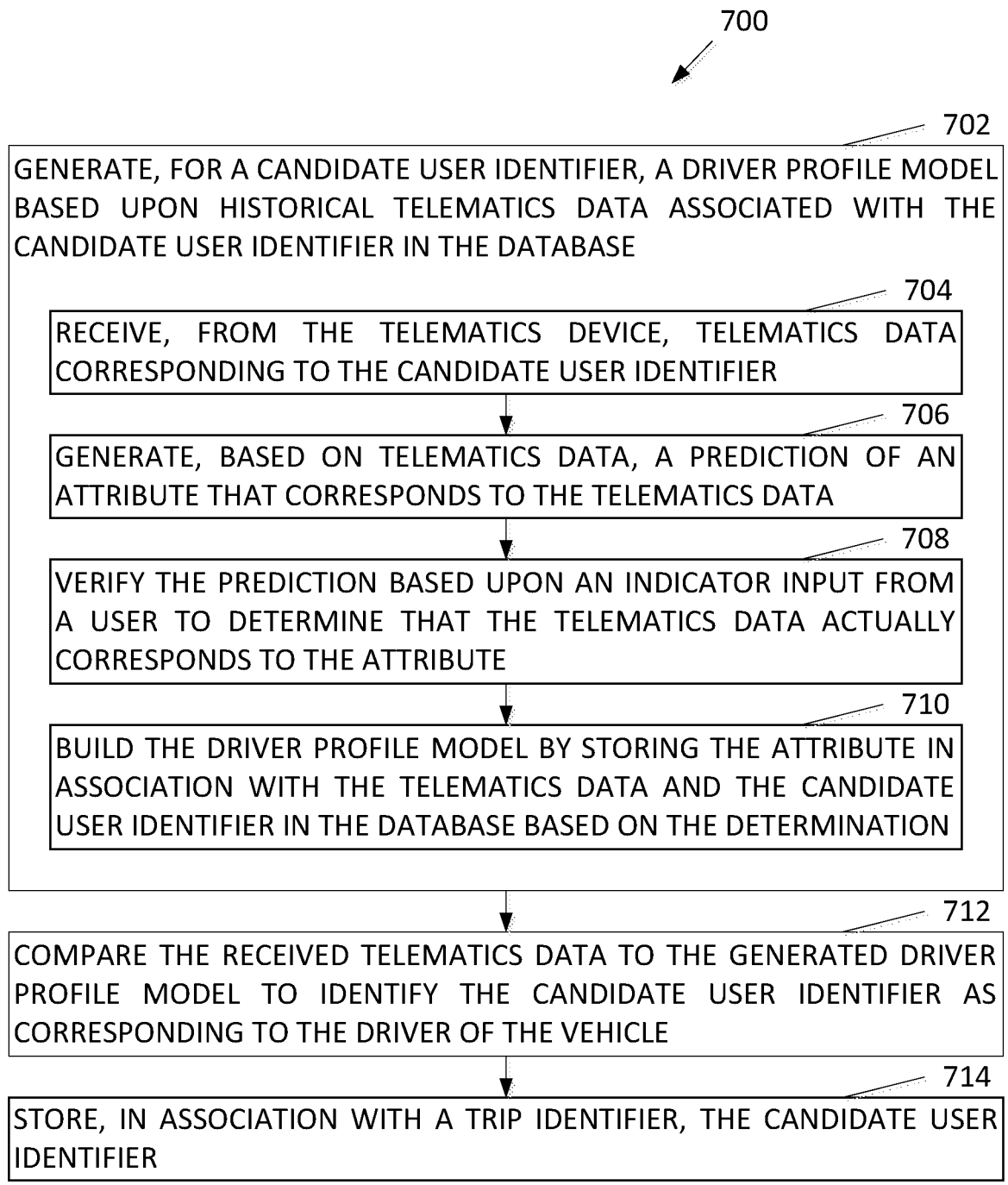
FIG. 7 illustrates an exemplary computer-implemented method for identifying a driver using a driver profile model based upon telematics data that may be performed by the VA system illustrated in FIG. 1.

Exemplary Method for Identifying a Driver Using a Driver Profile Model Based Upon Telematics Data FIG. 7 illustrates an exemplary computer-implemented method 700 for identifying a driver using a driver profile model based upon telematics data that may be may be implemented using one or more components of VA system 100 (shown in FIG. 1).

Computer-implemented method 700 may include generating 702, for a candidate user identifier, a driver profile model based upon historical telematics data associated with the candidate user identifier in the database. In some embodiments, generating 702 the driver profile model may be performed by VA computing device 102, such as by executing analytics module 332 (shown in FIG. 3).

In some embodiments, to generate the driver profile model, method 700 may include receiving 704, from the telematics device, telematics data corresponding to the candidate user identifier. In some embodiments, receiving 704 the telematics data may be performed by VA computing device 102, such as by executing communication module 330 (shown in FIG. 3).

In such embodiments, method 700 may further include generating 706, based upon a telematics data, a prediction of an attribute that corresponds to the telematics data. In some embodiments, generating 706 the prediction may be performed by VA computing device 102, such as by executing analytics module 332 (shown in FIG. 3).

In such embodiments, method 700 may further include verifying 708 the prediction based upon an indicator input from a user to determine that the telematics data actually corresponds to the attribute. In some embodiments, verifying 708 the prediction may be performed by VA computing device 102, such as by executing communication module 330 (shown in FIG. 3).

In such embodiments, method 700 may further include building 710 the driver profile model by storing the attribute in association with the telematics data and the candidate user identifier in the database based upon the determination. In some embodiments, building 710 the driver profile model may be performed by VA computing device 102, such as by executing data management module 334 (shown in FIG. 3).

Computer-implemented method 700 may further include comparing 712 the received telematics data to the generated driver profile model to identify the candidate user identifier as corresponding to the driver of the vehicle. In some embodiments, comparing 712 the received telematics data to the driver profile model may be performed by VA computing device 102, such as by executing analytics module 332 (shown in FIG. 3).

Computer-implemented method 700 may further include storing 714, in association with a trip identifier, the candidate user identifier. In some embodiments, storing 714 the candidate user identifier may be performed by VA computing device 102, such as by executing data management module 334 (shown in FIG. 2).

Figure 8:
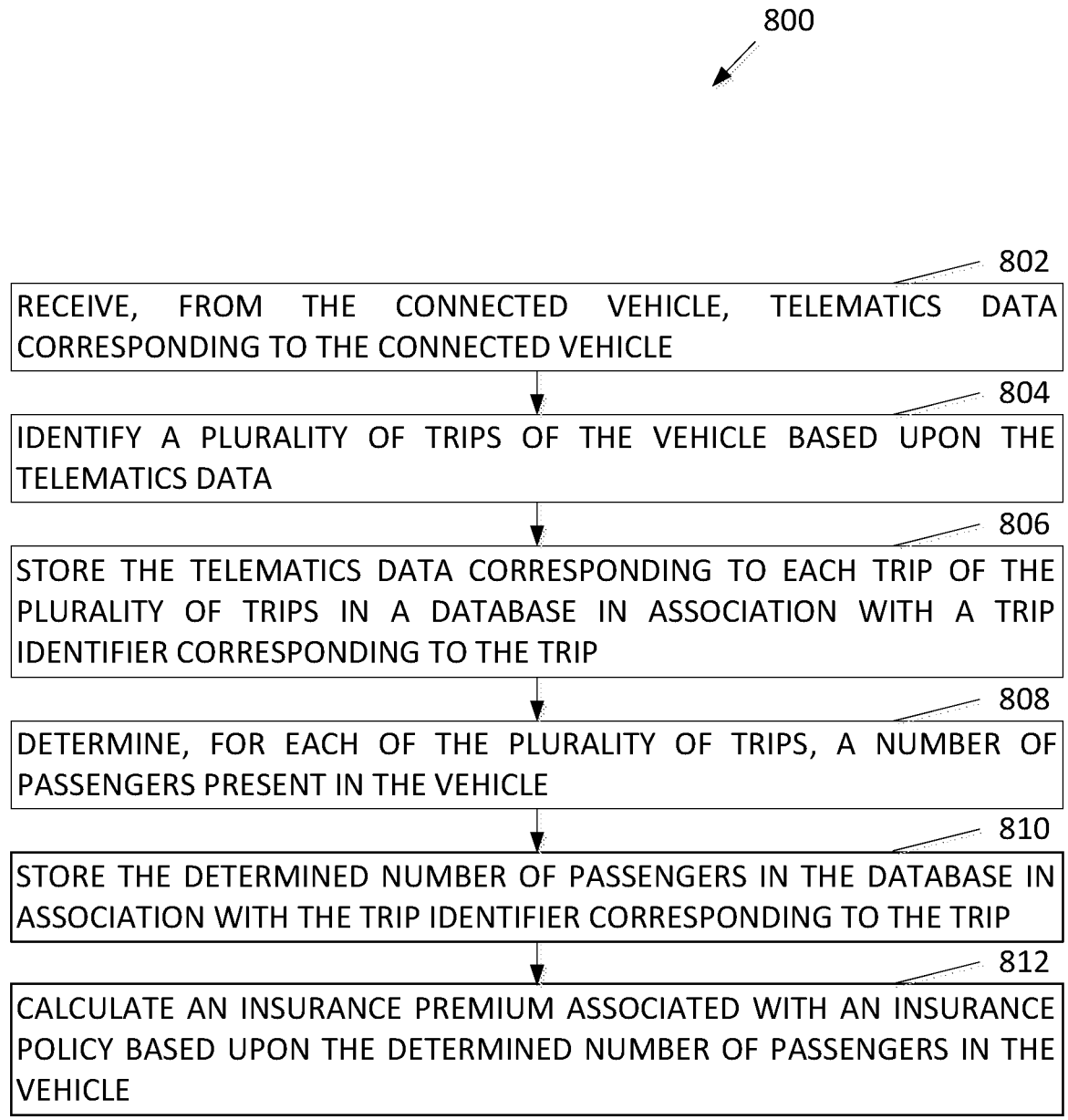
FIG. 8 illustrates an exemplary computer-implemented method for determining a number of passengers present in a vehicle for a trip that may be performed by the VA system illustrated in FIG. 1.

Exemplary Method for Determining a Number of Passengers Present in a Vehicle for a Trip FIG. 8 illustrates an exemplary computer-implemented method 800 for determining a number of passengers present in a vehicle for a trip that may be implemented using one or more components of VA system 100 (shown in FIG. 1).

Computer-implemented method 800 may include receiving 802, from the connected vehicle, telematics data corresponding to the connected vehicle. In some embodiments, receiving 802 the telematics data may be performed by VA computing device 102, such as by executing communication module 330 (shown in FIG. 3). In some embodiments, the telematics data includes sensor data from the connected vehicle. In such embodiments, the sensor data may include at least one of camera data, seat sensor data, active suspension systems data, and door sensor data.

Computer-implemented method 800 may further include identifying 804 a plurality of trips of the vehicle based upon the telematics data. In some embodiments, identifying 804 the plurality of trips may be performed by VA computing device 102, such as by executing analytics module 332 (shown in FIG. 3).

Computer-implemented method 800 may further include storing 806 the telematics data corresponding to each trip of the plurality of trips in a database in association with a trip identifier corresponding to the trip. In some embodiments, storing 806 the trip identifier may be performed by VA computing device 102, such as by executing data management module 334 (shown in FIG. 3).

Computer-implemented method 800 may further include determining 808, for each of the plurality of trips, a number of passengers present in the vehicle. In some embodiments, determining 808 the number of passengers may be performed by VA computing device 102, such as by executing analytics module 332 (shown in FIG. 3). In some embodiments, determining 808 the number of passengers includes determining the number of passengers based upon sensor data from the connected vehicle. In such embodiments, sensor data may include at least one of camera data, seat sensor data, active suspension systems data, and door sensor data.

Computer-implemented method 800 may further include storing 810 the determined number of passengers in the database in association with the trip identifier corresponding to the trip. In some embodiments, storing 812 the determined number of passengers may be performed by VA computing device 102, such as by executing data management module 334 (shown in FIG. 3).

Computer-implemented method 800 may further include calculating 812 an insurance premium associated with an insurance policy based upon the determined number of passengers in the vehicle. In some embodiments, calculating 814 the insurance premium may be performed by VA computing device 102, such as by executing analytics module 332 (shown in FIG. 3). In some embodiments, method 800 further includes identifying, for each trip of the plurality of trips, a driver of the vehicle based upon the telematics data, storing, in association with each trip identifier, a user identifier corresponding to the identified driver for the trip identifier, parsing, for each user identifier, the database to aggregate telematics data associated with the user identifier; and calculating, for each user identifier, an insurance premium for an insurance policy (such as a UBI policy) associated with the user identifier based upon the aggregated telematics data corresponding to the user identifier.

Figure 9:
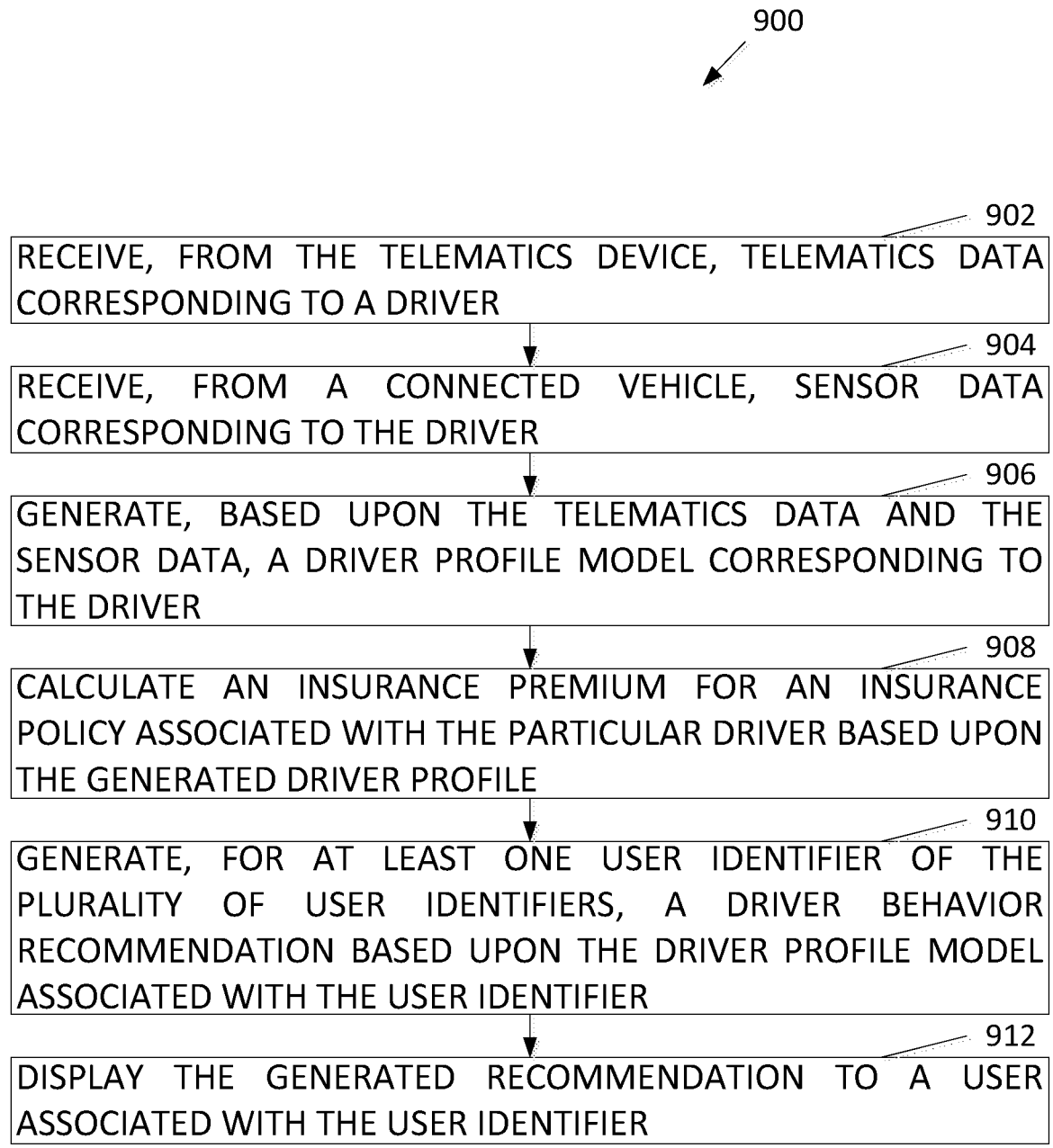
FIG. 9 illustrates an exemplary computer-implemented method for determining an insurance premium using a driver profile model based upon telematics data that may be performed by the VA system illustrated in FIG. 1.

Exemplary Method for Determining an Insurance Premium Using a Driver Profile Model Based Upon Telematics Data FIG. 9 illustrates an exemplary computer-implemented method 900 for determining an insurance premium using a driver profile model based upon telematics data that may be may be implemented using one or more components of system 100 (shown in FIG. 1).

Computer-implemented method 900 may include receiving 902, from the telematics device, telematics data corresponding to a driver. In some embodiments, receiving 902 telematics data may be performed by VA computing device 102, such as by executing communication module 330 (shown in FIG. 3).

Computer-implemented method 900 may also include receiving 904, from a connected vehicle, sensor data corresponding to the driver. In some embodiments, receiving 904 sensor data may be performed by VA computing device 102, such as by executing communication module 330 (shown in FIG. 3).

Computer-implemented method 900 may also include generating 906, based upon the telematics data and the sensor data, a driver profile model corresponding to the driver. In some embodiments, generating 906 the driver profile model may be performed by VA computing device 102, such as by executing analytics module 332 (shown in FIG. 3).

Computer-implemented method 900 may also include calculating 908 an insurance premium for an insurance policy (such as a UBI policy) associated with the particular driver based upon the generated driver profile. In some embodiments, calculating 908 the insurance premium may be performed by VA computing device 102, such as by executing analytics module 332 (shown in FIG. 3).

In some embodiments, computer-implemented method 900 may also include generating 910 for at least one user identifier of the plurality of user identifiers, a driver behavior recommendation based upon the driver profile model associated with the user identifier, and displaying 912 the generated recommendation to a user associated with the user identifier. In some embodiments, generating 910 the driver behavior recommendation may be performed VA computing device 102, such as by executing communication module 330 (shown in FIG. 3).

Exemplary Hybrid Savings Account Implementation

Figure 10:
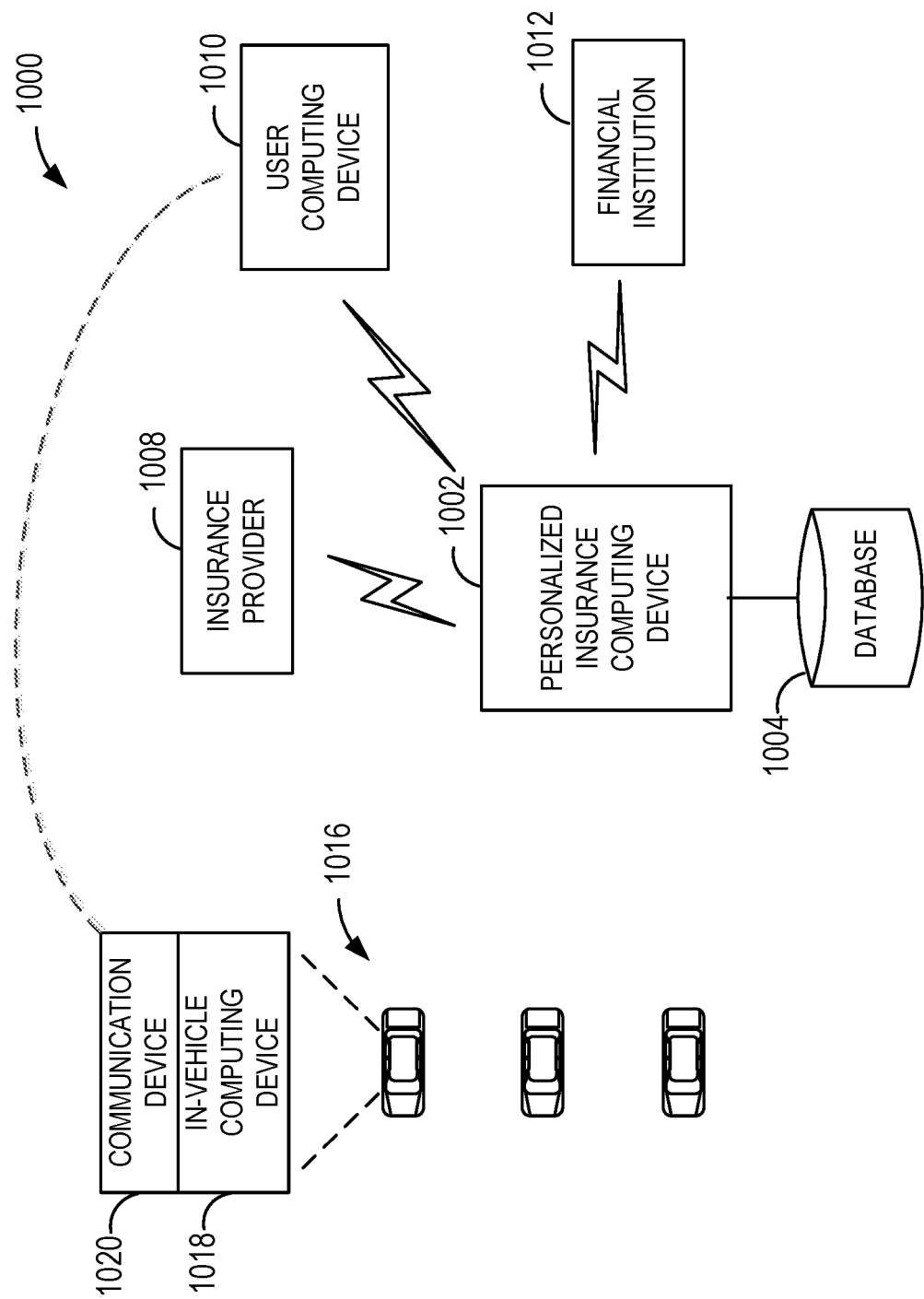
FIG. 10 illustrates an exemplary diagram of a system implementing a hybrid savings account.

FIG. 10 illustrates an exemplary diagram of a system 1000 implementing a hybrid savings account ("HSA"). In the exemplary embodiment, the system 1000 may include a personalized insurance (PI) computing device 1002, which may be, for example, VA computing device 102 (shown in FIG. 1). Vehicle 1016 may include in-vehicle computing device 1018 including communication device 1020. Vehicle 1016 may be, for example, connected vehicle 110 (shown in FIG. 1). In the exemplary embodiment, communication device 1020 may be used to communicate with user computing device 1010. PI computing device 1002 may also be in communication with insurance provider 1008 (e.g., via insurer computing device 114 shown in FIG. 1). PI computing device 1002 may also be in communication with a financial institution 1012 (e.g., a bank or insurance provider). PI computing device may also be in communication with a database 1004

In the exemplary embodiment, PI computing device 1002 may offer to establish an HSA for a user using user computing device 1010. User computing device 1010 may be used by the user to apply for and/or register for the HSA by inputting personal information and a request to establish the HSA into user computing device 1010. PI computing device 1010 may receive the personal user data from user computing device 1010 and process the personal user data to establish the HSA. In some embodiments, PI computing device 1002 may transmit a list naming a plurality of financial institutions to user computing device 1010 to enable a user to select a preferred financial institution to establish and maintain the HSA. PI computing device 1002 receives the financial institution selection from user computing device 1010. In the exemplary embodiment, financial institution 1012 is used to establish and maintain the HSA in accordance with applicable financial rules and regulations.

In the exemplary embodiment, insurance provider 1008 may offer insurance services (e.g., usage-based insurance) to the user and may be associated with the HSA. In some embodiments, insurance provider 108 may be permitted to directly withdraw funds from the HSA be executing a transaction with financial institution 1012. In the exemplary embodiment, insurance provider 108 transmits requests to PI computing device 1002 indicating services have been rendered and payment is due. PI computing device 1002 withdraws the funds from the HSA by executing a financial transaction with financial institution 1012. PI computing device 1002 transmits the funds to insurance provider 1008 or otherwise causes the funds to be transferred to insurance provider 1002.

In some embodiments, funds held in the HSA may be used to purchase supplemental and/or additional insurance coverage from insurance provider 1008. PI computing device 1002 may facilitate insurance related transactions. Payment transactions for other purposes using funds in the HSA may be otherwise limited.

Figure 11:
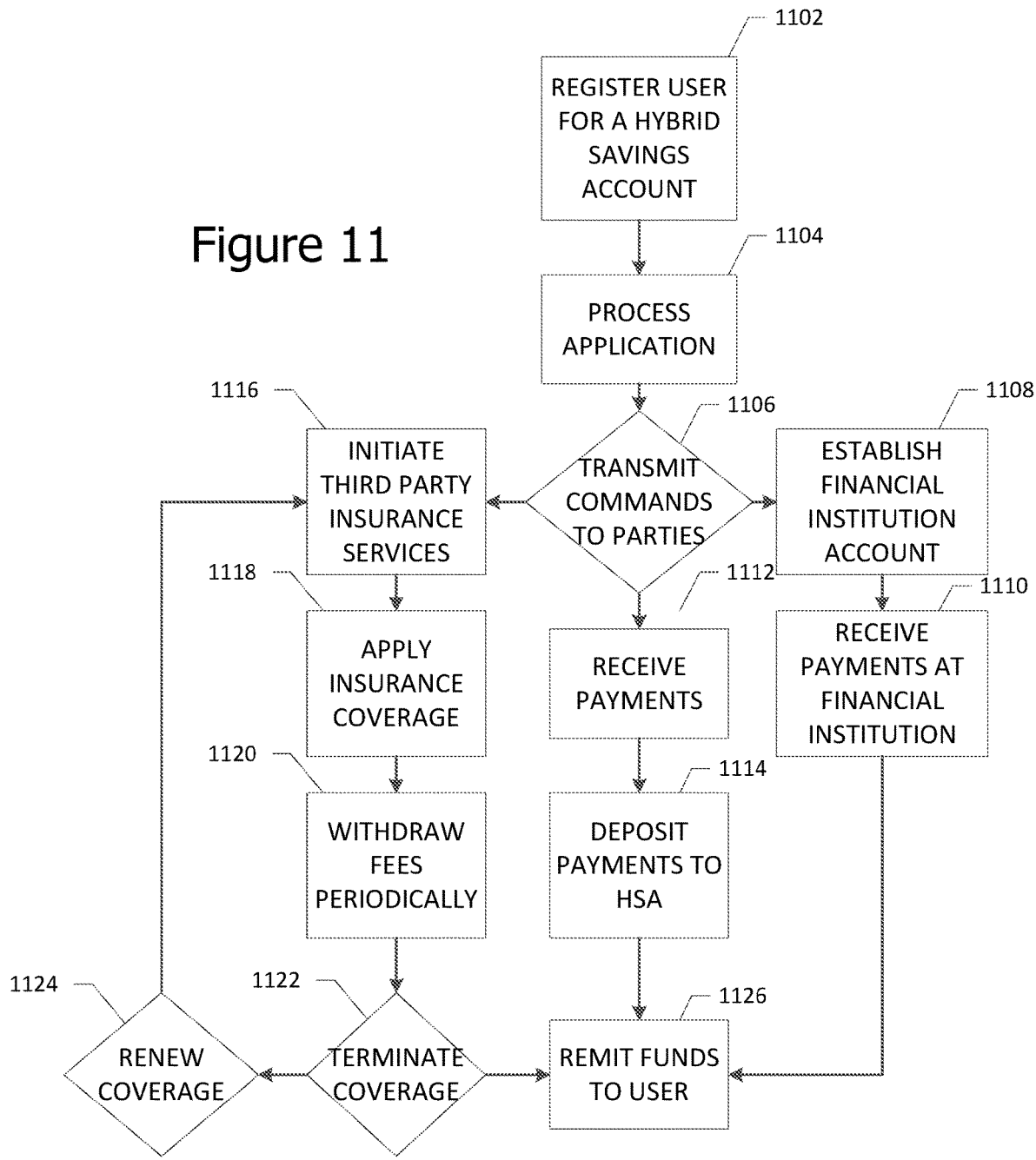
FIG. 11 illustrates a flow chart of an exemplary computer-implemented process for operating a hybrid savings account in an exemplary system.

FIG. 11 illustrates a flow chart 1100 of an exemplary computer-implemented process for operating a hybrid savings account in an exemplary system.

In the exemplary embodiment a user may register 1102 with PI computing device 1002 for an HSA. PI computing device 1002 may process 1104 the application by, for example, parsing personal information from user input data provided by the user during user registration 1102. Processing 1104 the application may also include determining a default or user selected service providers (e.g., a preferred financial institution to establish the HSA, a third party service provider such as a preferred insurance provider, etc.) to establish and manage the HSA.

In the exemplary embodiment, PI computing device 1002 may transmit 1106 commands to respective determined parties to: (i) establish the HSA at financial institution 1012, and (ii) notify insurance provider 1008 of the HSA and to initialize services (e.g., provide insurance coverage) for the user. In the exemplary embodiment, financial institution 1012 may establish 1108 the HSA based upon the information transmitted from PI computing device 1002. Financial institution 1012 may receive 1110 payments and from PI computing device 1002 and deposits funds accordingly into the HSA. In some embodiments, the payments may be received 1112 by PI computing device 1002 from the user by the user. PI computing device 1002 may deposit 1114 or cause to be deposited the received payments into the HSA.

Third party entities such as insurance provider 1008 may initiate 1116 insurance coverage based upon information transmitted 1106 from PI computing device 1002. In the exemplary embodiment, insurance provider 1008 may apply 1118 the prescribed insurance coverage for the user. Insurance provider 1008 may withdraw 1120 fees from the HSA based upon the type of insurance coverage requested. For example, an insurance premium may be calculated based upon an average number of passengers on trips where the user is the driver and may be determined based upon an average number of passengers calculated on a periodic basis (e.g., per hour, per day, per week, per month, etc.) and withdrawn on a predetermined timetable.

In the exemplary embodiment, insurance coverage may terminate 1122 after a period of time. In some embodiments, insurance coverage may terminate 1122 after the conclusion of a predetermined event. Upon termination, insurance provider 1008 may offer to renew 1124 insurance coverage under the same or similar conditions. In some embodiments, renewal 1124 may be automatic. PI computing device 1002 may instruct insurance provider 1008 to again initiate 1116 insurance coverage. The user may choose to discontinue the HSA and PI computing device may remit 1126 remaining funds to the user.

Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, historical estimates, and/or actual repair costs. The machine learning programs may utilize deep learning algorithms that may be primarily focused on pattern recognition, and may be trained after processing multiple examples. The machine learning programs may include Bayesian program learning (BPL), reinforced learning techniques, voice recognition and synthesis, image or object recognition, optical character recognition, and/or natural language processing—either individually or in combination. The machine learning programs may also include natural language processing, semantic analysis, automatic reasoning, and/or other types of machine learning or artificial intelligence.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

As described above, the systems and methods described herein may use machine learning, for example, for pattern recognition. That is, machine learning algorithms may be used by the VA computing device to attempt to identify patterns within telematics data and/or sensor data, for example, to generate a driver profile model corresponding to a driver. Further, machine learning algorithms may be used by the VA computing device to predict a driver's future transportation behavior based upon the patterns and likely outcomes associated with the driver's future transportation behavior to calculate an insurance premium for a usage-based insurance policy associated with the driver and/or generate recommendations for the driver to adopt safer driving behaviors. Accordingly, the systems and methods described herein may use machine learning algorithms for both pattern recognition and predictive modeling.

Exemplary Embodiments

In one aspect, a vehicle analytics (VA) computing device may be provided. The VA computing device may include a processor and/or associated transceiver in communication with a memory device and a telematics device, and the processor and/or associated transceiver may be configured to: (1) receive, from the telematics device, telematics data corresponding to a vehicle, such as via wireless communication or data transmission over one or more radio frequency links; (2) identify a plurality of trips of the vehicle based upon the telematics data; (3) store the telematics data corresponding to each trip of the plurality of trips in a database in association with a trip identifier corresponding to the trip; (4) identify, for each trip of the plurality of trips, a driver of the vehicle based upon the telematics data; (5) store, in association with each trip identifier, a user identifier corresponding to the identified driver for the trip identifier; (6) parse, for each user identifier, the database to aggregate telematics data associated with the user identifier; and/or (7) calculate, for each user identifier, an insurance premium for an insurance policy (such as a UBI policy) associated with the user identifier based upon the aggregated telematics data corresponding to the user identifier. The VA computing device may include additional, less, or alternate functionality, including that discussed elsewhere herein.

In another aspect, a computer-implemented method may be provided. The computer-implemented method may be performed by a vehicle analytics (VA) computing device including a processor and/or associated transceiver in communication with a memory device and a telematics device. The computer-implemented method may include: (1) receiving, by the VA computing device, from the telematics device, telematics data corresponding to a vehicle; (2) identifying, by the VA computing device, a plurality of trips of the vehicle based upon the telematics data; (3) storing, by the VA computing device, the telematics data corresponding to each trip of the plurality of trips in a database in association with a trip identifier corresponding to the trip; (4) identifying, by the VA computing device, for each trip of the plurality of trips, a driver of the vehicle based upon the telematics data; (5) storing, by the VA computing device, in association with each trip identifier, a user identifier corresponding to the identified driver for the trip identifier; (6) parsing, by the VA computing device, for each user identifier, the database to aggregate telematics data associated with the user identifier; and/or (7) calculating, by the VA computing device, for each user identifier, an insurance premium for an insurance policy (such as a UBI policy) associated with the user identifier based upon the aggregated telematics data corresponding to the user identifier. The computer-implemented method may include additional, less, or alternate actions, including those discussed elsewhere herein.

In another aspect, at least one non-transitory computer-readable media having computer-executable instructions embodied thereon may be provided. When performed by a vehicle analytics (VA) computing device including a processor and/or associated transceiver in communication with a memory device and a telematics device, the computer-executable instructions may cause the processor to: (1) receive, from the telematics device, telematics data corresponding to a vehicle; (2) identify a plurality of trips of the vehicle based upon the telematics data; (3) store the telematics data corresponding to each trip of the plurality of trips in a database in association with a trip identifier corresponding to the trip; (4) identify, for each trip of the plurality of trips, a driver of the vehicle based upon the telematics data; (5) store, in association with each trip identifier, a user identifier corresponding to the identified driver for the trip identifier; (6) parse, for each user identifier, the database to aggregate telematics data associated with the user identifier; and/or (7) calculate, for each user identifier, an insurance premium for an insurance policy (such as a UBI policy) associated with the user identifier based upon the aggregated telematics data corresponding to the user identifier. The computer-executable instructions may direct additional, less, or alternate functionality, including that discussed elsewhere herein.

In another aspect, a vehicle analytics (VA) computing device may be provided. The VA computing device may include a processor and/or associated transceiver in communication with a memory device and a connected vehicle, and the processor and/or associated transceiver may be configured to: (1) receive, from the connected vehicle, telematics data corresponding to the connected vehicle (such as via wireless communication or data transmission over one or more radio frequency links); (2) identify a plurality of trips of the vehicle based upon the telematics data; (3) store the telematics data corresponding to each trip of the plurality of trips in a database in association with a trip identifier corresponding to the trip; (4) determine, for each of the plurality of trips, a number of passengers present in the vehicle; (5) store the determined number of passengers in the database in association with the trip identifier corresponding to the trip; and/or (6) calculate an insurance premium associated with an insurance policy (such as a UBI policy) based upon the determined number of passengers in the vehicle. The VA computing device may include additional, less, or alternate functionality, including that discussed elsewhere herein.

In another aspect, a computer-implemented method may be provided. The computer-implemented method may be performed by a vehicle analytics (VA) computing device including a processor and/or associated transceiver in communication with a memory device and a connected vehicle. The computer-implemented method may include: (1) receiving, by the VA computing device, from the connected vehicle, telematics data corresponding to the connected vehicle (such as via wireless communication or data transmission over one or more radio frequency links); (2) identifying, by the VA computing device, a plurality of trips of the vehicle based upon the telematics data; (3) storing, by the VA computing device, the telematics data corresponding to each trip of the plurality of trips in a database in association with a trip identifier corresponding to the trip; (4) determining, by the VA computing device, for each of the plurality of trips, a number of passengers present in the vehicle; (5) storing, by the VA computing device, the determined number of passengers in the database in association with the trip identifier corresponding to the trip; and/or (6) calculating, by the VA computing device, an insurance premium associated with an insurance policy (such as a UBI policy) based upon the determined number of passengers in the vehicle. The computer-implemented method may include additional, less, or alternate actions, including those discussed elsewhere herein.

In another aspect, at least one non-transitory computer-readable media having computer-executable instructions embodied thereon may be provided. When executed by a vehicle analytics (VA) computing device including a processor and/or associated transceiver in communication with a memory device and a connected vehicle, the computer-executable instructions may cause the processor to: (1) receive, from the connected vehicle, telematics data corresponding to the connected vehicle (such as via wireless communication or data transmission over one or more radio frequency links); (2) identify a plurality of trips of the vehicle based upon the telematics data; (3) store the telematics data corresponding to each trip of the plurality of trips in a database in association with a trip identifier corresponding to the trip; (4) determine, for each of the plurality of trips, a number of passengers present in the vehicle; (5) store the determined number of passengers in the database in association with the trip identifier corresponding to the trip; and/or (6) calculate an insurance premium associated with an insurance policy (such as a UBI policy) based upon the determined number of passengers in the vehicle. The computer-executable instructions may direct additional, less, or alternate functionality, including that discussed elsewhere herein.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A vehicle analytics (VA) computing device comprising a processor in communication with a memory device and a vehicle, the processor configured to:
   receive, from telematics sensors associated with the vehicle, historical telematics data corresponding to the vehicle, the historical telematics data including historical sensor data collected from the vehicle;
   generate, using the historical telematics data, a driver profile model for a user of the vehicle;
   receive, from the telematics sensors, additional telematics data associated with a plurality of trips driven by the user using the vehicle;
   train, using machine learning techniques and the additional telematics data, the driver profile model to identify patterns in driving behaviors of the user, the driving behaviors including a driving style of the user, routes driven by the user, and driving preferences of the user;
   store, in a database, the trained driver profile model;
   receive, from the telematics sensors, current telematics data associated with a trip taken by the vehicle;
   identify the user as a driver of the vehicle during the trip by comparing the current telematics data to the trained driver profile model;
   in response to identifying the user as the driver of the vehicle, output, from the trained driver profile model, (i) a driver profile of the user and (ii) driving recommendations for the user based upon the identified patterns for the user, the driving recommendations including recommendations for the user to improve driving behaviors associated with vehicle operation;
   cause the driving recommendations to be displayed on a user device of the user; transmit a prompt to the user device to confirm that the user is the driver of the vehicle;
   receive, from the user device, a confirmation indicating that the user is the driver;
   reinforce the trained driver profile model for the user based upon the confirmation, the confirmation causing the VA computing device to add weight to the identified patterns when identifying the user as the driver; and
   determine, based upon subsequent telematics data received from the telematics sensors, that the user followed the driving recommendations transmitted to the user device.

2. The VA computing device of claim 1, wherein the processor is configured to determine a number of passengers based upon the historical sensor data received from the vehicle.

3. The VA computing device of claim 1, wherein the telematics sensors include at least one of one or more cameras, seat sensors, active suspension systems sensors, or door sensors.

4. The VA computing device of claim 1, wherein the processor is further configured to:
   identify, for each trip of the plurality of trips, a vehicle driver of the vehicle based upon the historical telematics data;
   store, in association with each trip identifier, a user identifier corresponding to the identified vehicle driver for that trip identifier;
   parse, for each user identifier, the database to aggregate historical telematics data associated with that user identifier; and
   generate, for each user identifier, a usage-based insurance (UBI) policy associated with that user identifier based upon the aggregated historical telematics data corresponding to that user identifier, wherein each UBI policy includes a corresponding insurance premium.

5. The VA computing device of claim 4, wherein to identify the vehicle driver of the vehicle, the processor is configured to:
   receive, from the vehicle, current sensor data;
   compare the received current sensor data to the historical sensor data stored in the database in association with a candidate user identifier; and
   identify the candidate user identifier as the vehicle driver of the vehicle.

6. The VA computing device of claim 5, wherein the processor is configured to:
   generate, based upon the aggregated historical telematics data associated with the candidate user identifier, a prediction of an attribute that corresponds to the historical telematics data;
   verify the prediction based upon an indicator input from a vehicle user to determine that the aggregated historical telematics data actually corresponds to the attribute; and
   build, based upon the determination, a driver profile model for the vehicle user by storing the attribute in association with the aggregated historical telematics data and the candidate user identifier in the database.

7. The VA computing device of claim 1, wherein the historical sensor data includes at least one of seat position settings, radio settings, camera data, or key fob data.

8. The VA computing device of claim 1, wherein the processor is further configured to:
   cause an application running on the user device to display the driving recommendations to the user.

9. The VA computing device of claim 1, wherein the processor is further configured to:
   receive funds from the user;
   transmit the funds to a financial institution to be deposited into a hybrid savings account; and
   transfer, from an insurance provider to the hybrid savings account, a reward when the user follows the driving recommendations.

10. The VA computing device of claim 1, wherein the processor is further configured to:
    store the historical telematics data corresponding to each trip of the plurality of trips in the database in association with a trip identifier corresponding to the trip; and
    store the identified patterns in the database in association with the trip identifier corresponding to each of the plurality of trips.

11. A computer-implemented method performed by a vehicle analytics (VA) computing device including a processor in communication with a memory device and a vehicle, the computer-implemented method comprising:
    receiving, by the VA computing device, from telematics sensors associated with the vehicle, historical telematics data corresponding to the vehicle, the historical telematics data including historical sensor data collected from the vehicle;
    generating, by the VA computing device using the historical telematics data, a driver profile model for a user of the vehicle;
    receiving, by the VA computing device from the telematics sensors, additional telematics data associated with a plurality of trips driven by the user using the vehicle;

training, by the VA computing device using machine learning techniques and the additional telematics data, the driver profile model to identify, by the VA computing device, patterns in driving behaviors of the user, the driving behaviors including a driving style of the user, routes driven by the user, and driving preferences of the user;

storing, by the VA computing device, in a database, the trained driver profile model;

receiving, by the VA computing device from the telematics sensors, current telematics data associated with a trip taken by the vehicle;

identifying, by the VA computing device, the user as a driver of the vehicle during the trip by comparing the current telematics data to the trained driver profile model;

in response to identifying the user as the driver of the vehicle, outputting, by the VA computing device from the trained driver profile model, (i) a driver profile of the user and (ii) driving recommendations for the user based upon the identified patterns for the user, the driving recommendations including recommendations for the user to improve driving behaviors associated with vehicle operation;

causing, by the VA computing device, the driving recommendations to be displayed on a user device of the user;

transmitting, by the VA computing device, a prompt to the user device to confirm that the user is the driver of the vehicle;

receiving, by the VA computing device from the user device, a confirmation indicating that the user is the driver;

reinforcing, by the VA computing device, the trained driver profile model for the user based upon the confirmation, the confirmation causing the VA computing device to add weight to the identified patterns when identifying the user as the driver; and determining, by the VA computing device based upon subsequent telematics data received from the telematics sensors, that the user followed the driving recommendations transmitted to the user device.

12. The computer-implemented method of claim 11, wherein the method further comprises determining, by the VA computing device, a number of passengers based upon the historical sensor data received from the vehicle.

13. The computer-implemented method of claim 11, wherein the telematics sensors include at least one of one or more cameras, seat sensors, active suspension systems sensors, or door sensors.

14. The computer-implemented method of claim 11, wherein the method further comprises:
identifying, for each trip of the plurality of trips, a vehicle driver of the vehicle based upon the historical telematics data;
storing, in association with each trip identifier, a user identifier corresponding to the identified vehicle driver for that trip identifier;
parsing, for each user identifier, the database to aggregate historical telematics data associated with that user identifier; and
generating, for each user identifier, a usage-based insurance (UBI) policy associated with that user identifier based upon the aggregated historical telematics data corresponding to that user identifier, wherein each UBI policy includes a corresponding insurance premium.

15. The computer-implemented method of claim 14, wherein identifying the vehicle driver of the vehicle comprises:
receiving, by the VA computing device, from the vehicle, current sensor data;
comparing, by the VA computing device, the received current sensor data to the historical sensor data stored in the database in association with a candidate user identifier; and
identifying, by the VA computing device, the candidate user identifier as the vehicle driver of the vehicle.

16. The computer-implemented method of claim 15, wherein the method further comprises:
generating, by the VA computing device, based upon the aggregated historical telematics data associated with the candidate user identifier, a prediction of an attribute that corresponds to the historical telematics data;
verifying, by the VA computing device, the prediction based upon an indicator input from a vehicle user to determine that the aggregated historical telematics data actually corresponds to the attribute; and
building, by the VA computing device based upon the determination, a driver profile model for the vehicle user by storing the attribute in association with the aggregated historical telematics data and the candidate user identifier in the database.

17. The computer-implemented method of claim 11, wherein the historical sensor data includes at least one of seat position settings, radio settings, camera data, or key fob data.

18. The computer-implemented method of claim 11, wherein the method further comprises:
causing, by the VA computing device, an application running on the user device to display the driving recommendations to the user.

19. The computer-implemented method of claim 11, wherein the method further comprises:
receiving, by the VA computing device funds from the user;
transmitting, by the VA computing device, the funds to a financial institution to be deposited into a hybrid savings account; and
transferring, by the VA computing device, from an insurance provider to the hybrid savings account, a reward when the user follows the driving recommendations.

20. The computer-implemented method of claim 11, wherein the method further comprises:
store the historical telematics data corresponding to each trip of the plurality of trips in the database in association with a trip identifier corresponding to the trip; and
store the identified patterns in the database in association with the trip identifier corresponding to each of the plurality of trips.

21. At least one non-transitory computer-readable medium having computer-executable instructions embodied thereon, wherein when executed by a vehicle analytics (VA) computing device including a processor in communication with a memory device and a vehicle, the computer-executable instructions cause the processor to:
receive, from telematics sensors associated with the vehicle, historical telematics data corresponding to the vehicle, the historical telematics data including historical sensor data collected from the vehicle;
generate, using the historical telematics data, a driver profile model for a user of the vehicle;

receive, from the telematics sensors, additional telematics data associated with a plurality of trips driven by the user using the vehicle;
train, using machine learning techniques and the additional telematics data, the driver profile model to identify patterns in driving behaviors of the user, the driving behaviors including a driving style of the user, routes driven by the user, and driving preferences of the user;
store, in a database, the trained driver profile model;
receive, from the telematics sensors, current telematics data associated with a trip taken by the vehicle;
identify the user as a driver of the vehicle during the trip by comparing the current telematics data to the trained driver profile model;
in response to identifying the user as the driver of the vehicle, output, from the trained driver profile model, (i) a driver profile of the user and (ii) driving recommendations for the user based upon the identified patterns for the user, the driving recommendations including recommendations for the user to improve driving behaviors associated with vehicle operation;
cause the driving recommendations to be displayed on a user device of the user;
transmit a prompt to the user device to confirm that the user is the driver;
receive, from the user device, a confirmation indicating that the user is the driver of the vehicle;
reinforce the trained driver profile model for the user based upon the confirmation, the confirmation causing the VA computing device to add weight to the identified patterns when identifying the user as the driver; and
determine, based upon subsequent telematics data received from the telematics sensors, that the user followed the driving recommendations transmitted to the user device.

* * * * *